(12) United States Patent
Yoshio

(10) Patent No.: US 7,228,347 B2
(45) Date of Patent: Jun. 5, 2007

(54) IMAGE PROCESSING DEVICE AND IMAGE PROCESSING METHOD

(75) Inventor: Hiroaki Yoshio, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 816 days.

(21) Appl. No.: 10/408,589

(22) Filed: Apr. 7, 2003

(65) Prior Publication Data

US 2003/0212831 A1 Nov. 13, 2003

(30) Foreign Application Priority Data

Apr. 8, 2002 (JP) ............ P 2002-105508

(51) Int. Cl.
*G06F 15/173* (2006.01)
(52) U.S. Cl. .......... 709/223; 709/246; 718/100; 715/523
(58) Field of Classification Search ........ 718/100; 358/448; 709/223, 246–247, 233; 348/113; 715/523

See application file for complete search history.

(56) References Cited

U.S. PATENT DOCUMENTS

| | | | | |
|---|---|---|---|---|
| 6,335,722 | B1 * | 1/2002 | Tani et al. | 345/173 |
| 6,925,475 | B2 * | 8/2005 | Essafi et al. | 707/104.1 |
| 2001/0024518 | A1 * | 9/2001 | Yaguchi | 382/170 |
| 2003/0126147 | A1 * | 7/2003 | Essafi et al. | 707/100 |
| 2004/0030992 | A1 * | 2/2004 | Moisa et al. | 715/513 |
| 2004/0233475 | A1 * | 11/2004 | Mikuni et al. | 358/1.15 |

FOREIGN PATENT DOCUMENTS

| | | |
|---|---|---|
| EP | 1 132 863 A1 | 9/2001 |
| JP | 2000-56958 | 2/2000 |

OTHER PUBLICATIONS

Tennenhouse et al., "The ViewStation: a Software-Intensive Approach to Media Processing and Distribution", Jul. 1995, pp. 104-115 (Cited on ESR-English Text).
Clouard et al., "Borg: A Knowledge-Based System for Automatic Generation of Image Processing Programs", Feb. 1999, pp. 128-144 (Cited on ESR-English Text).

* cited by examiner

*Primary Examiner*—Abdullahi Salad
(74) *Attorney, Agent, or Firm*—Pearne & Gordon LLP

(57) ABSTRACT

It is one objective of the present invention to provide an image processing device that can easily implement an image processing function consonant with the need or application of a user. The image processing device comprises task storage, a task manager, a component manager, and a software bus manager. The task storage controls task scenario information indicating components used for an image processing task and information as to couple the components, component information, and substances of the components. The task manager analyzes the task scenario information and determines components used for the task and a software bus connecting the components. The component manager generates, deletes, or controls the components. The software bus manager generates or deletes the software bus, and controls the data exchange across the software bus.

12 Claims, 28 Drawing Sheets

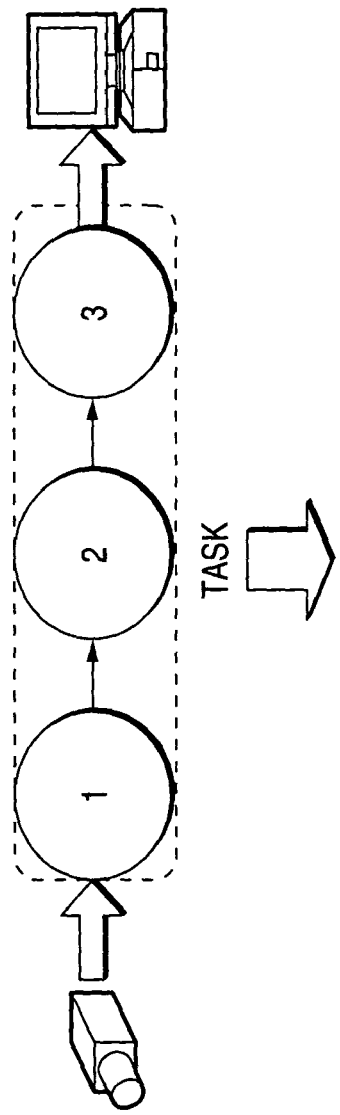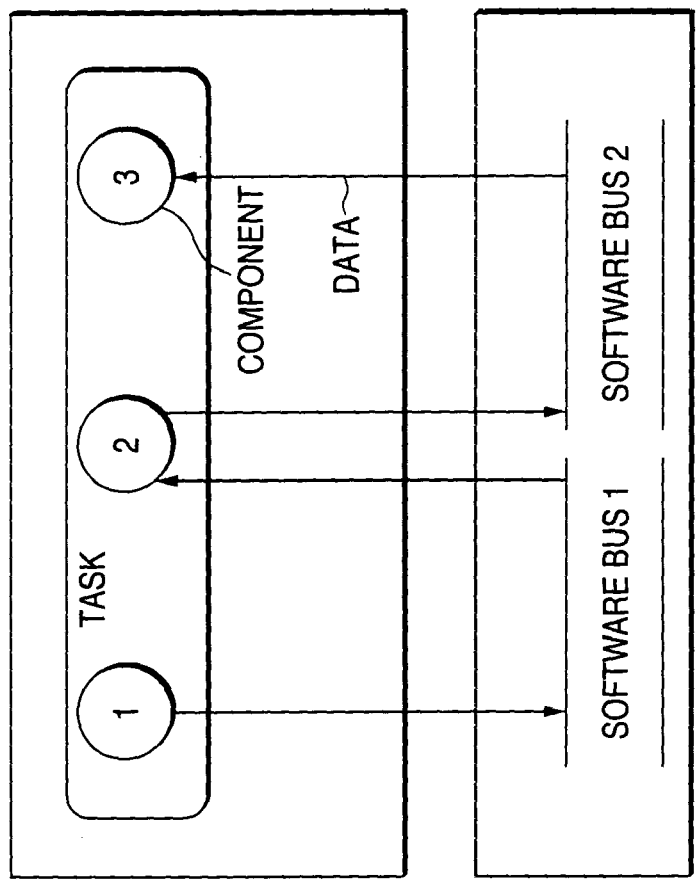
FIG. 2A  FIG. 2B  FIG. 2C

BIND/UNBIND: START/HALT OF ACCESS TO SOFTWARE BUS
PARA. CHNG: CHANGE PARAMETER OF COMPONENT
CTRL: CONTROL COMMAND
(EX. COMMANDS FOR REPLAY, SUCH AS "PLAY", "STOP" AND "PAUSE")

FIG. 6

| MANAGEMENT INFORMATION | DETAILS |
|---|---|
| MEDIA FORMAT | MEDIA TYPE (0: VIDEO, 1: AUDIO) |
| ENCODING FORMAT | ENCODED MEDIA STATE (0: JPEG, 1: H.261, 2: H.263, 3: YUV) |
| LEVEL | MEDIA IMPORTANCE LEVEL (0: ORGINARILY, 10: OTHERS (VIDEO IN ABERRATION)) |
| TIME CODE | MEDIA TIME CODE |
| MEDIA IDENTIFIER | UNIQUE RECOGNITION NUMBER FOR EACH MEDIUM (EX., FRAME NO.) |
| MAXIMUM STORAGE SIZE | MAXIMUM IMAGE STORAGE AREA SIZE |
| STORAGE SIZE | ACTUAL DATA STORAGE SIZE |
| ACTUAL DATA POINTER | OFFSET HEAD OF DATA STORAGE AREA |
| RESERVE 1~5 | RESERVED AREA (EX., RECOGNITION INFORMATION) |

FIG. 7

| CONTROL MECHANISM | DETAILS |
|---|---|
| MULTIPLE ACCESSES | ONE COMPONENT FOR WRITING DATA TO SOFTWARE BUS MULTIPLE COMPONENTS FOR READING DATA FROM SOFTWARE BUS |
| EXCLUSIVE CONTROL | DO NOT PERFORM DATA WRITING/READING AT SAME TIME FOR DATA STRUCTURE OF SHARED MEMORY |
| FIFO/LIO READ | <FIFO (FIRST IN FIRST OUT) > TRANSMIT DATA BEGINNING WITH OLDEST DATA STRUCTURE IN SOFTWARE BUS <LIO (LAST IN ONLY OUTPUT) > ALWAYS TRANSMIT ONLY LATEST DATA STRUCTURE IN SOFTWARE BUS |
| ASYNCHRONOUS/ SYNCHRONOUS WRITE | <ASYNCHRONOUS> PERMIT REWRITING TO EACH SHARED MEMORY DATA STRUCTURE, EVEN WITHOUT READING DATA <SYNCHRONOUS> INHIBIT REWRITING TO EACH SHARED MEMORY DATA STRUCTURE, UNTIL DATA READING IS STARTED |
| ASYNCHRONOUS/ SYNCHRONOUS ACK | <ASYNCHRONOUS> READ: TRANSMIT MESSAGE THAT READING ACROSS SOFTWARE BUS IS INHIBITED WRITE: TRANSMIT MESSAGE THAT WRITING ACROSS SOFTWARE BUS IS INHIBITED <SYNCHRONOUS> READ: WHEN READING ACROSS SOFTWARE BUS IS INHIBITED, RETURN NO RESPONSE UNTIL READING IS PERMITTED WRITE: WHEN WRITING ACROSS SOFTWARE BUS IS INHIBITED, RETURN NO RESPONSE UNTIL WRITING IS PERMITTED |
| BUS RESET | INITIALIZE ACCESS POINT FOR EACH COMPONENT, AND USE DESIGNATED PARAMETER (ASYNCHRONOUS/SYNCHRONOUS WRITING, FIFO/LIO READING OR ASYNCHRONOUS/SYNCHRONOUS ACK) FOR RESETTING |
| ACQUISITION OF LATEST READ POSITION | OBTAIN INFORMATION FOR STORAGE LOCATION OF LATEST SHARED MEMORY STRUCTURE FROM WHICH DATA HAS BEEN READ |

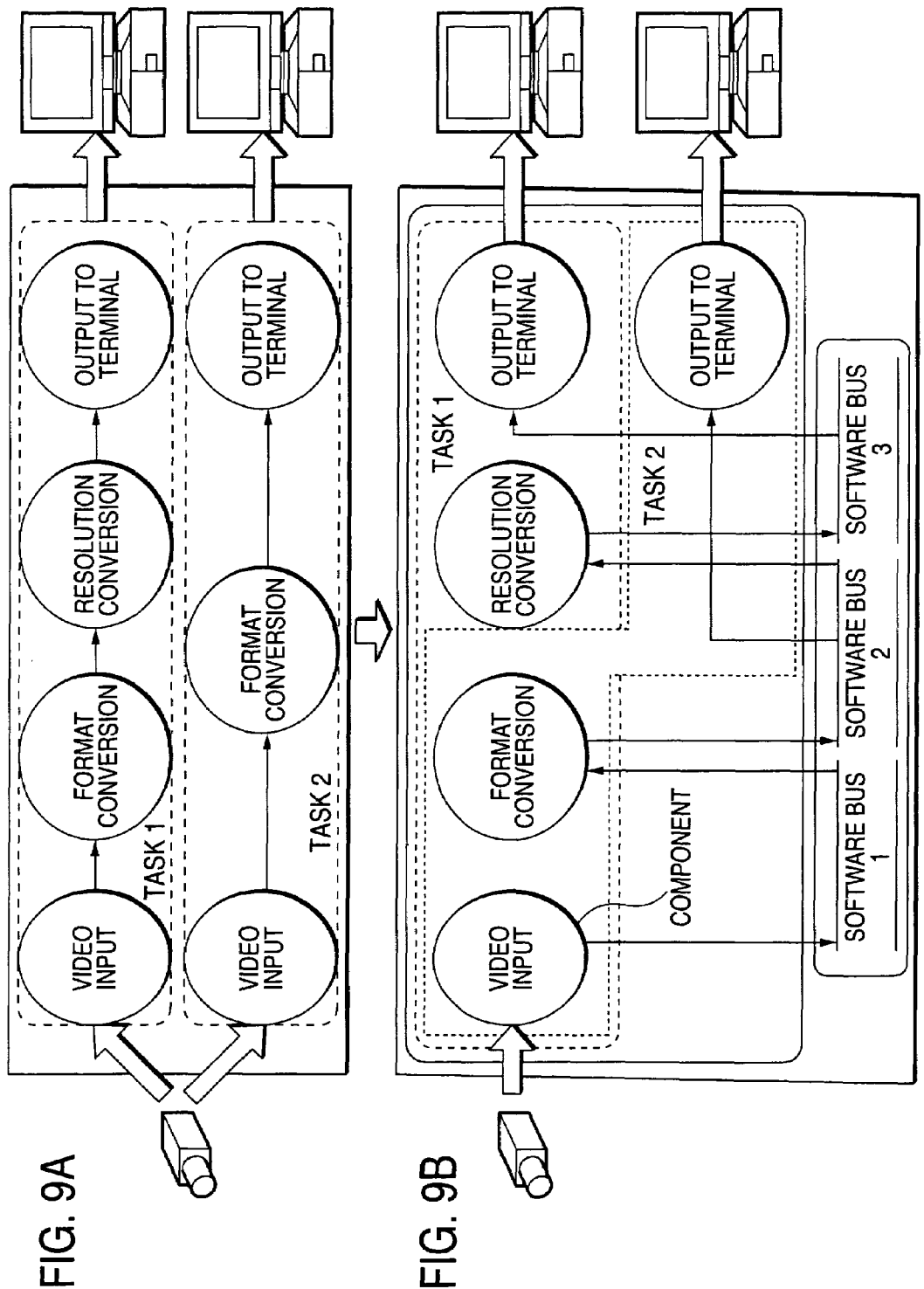

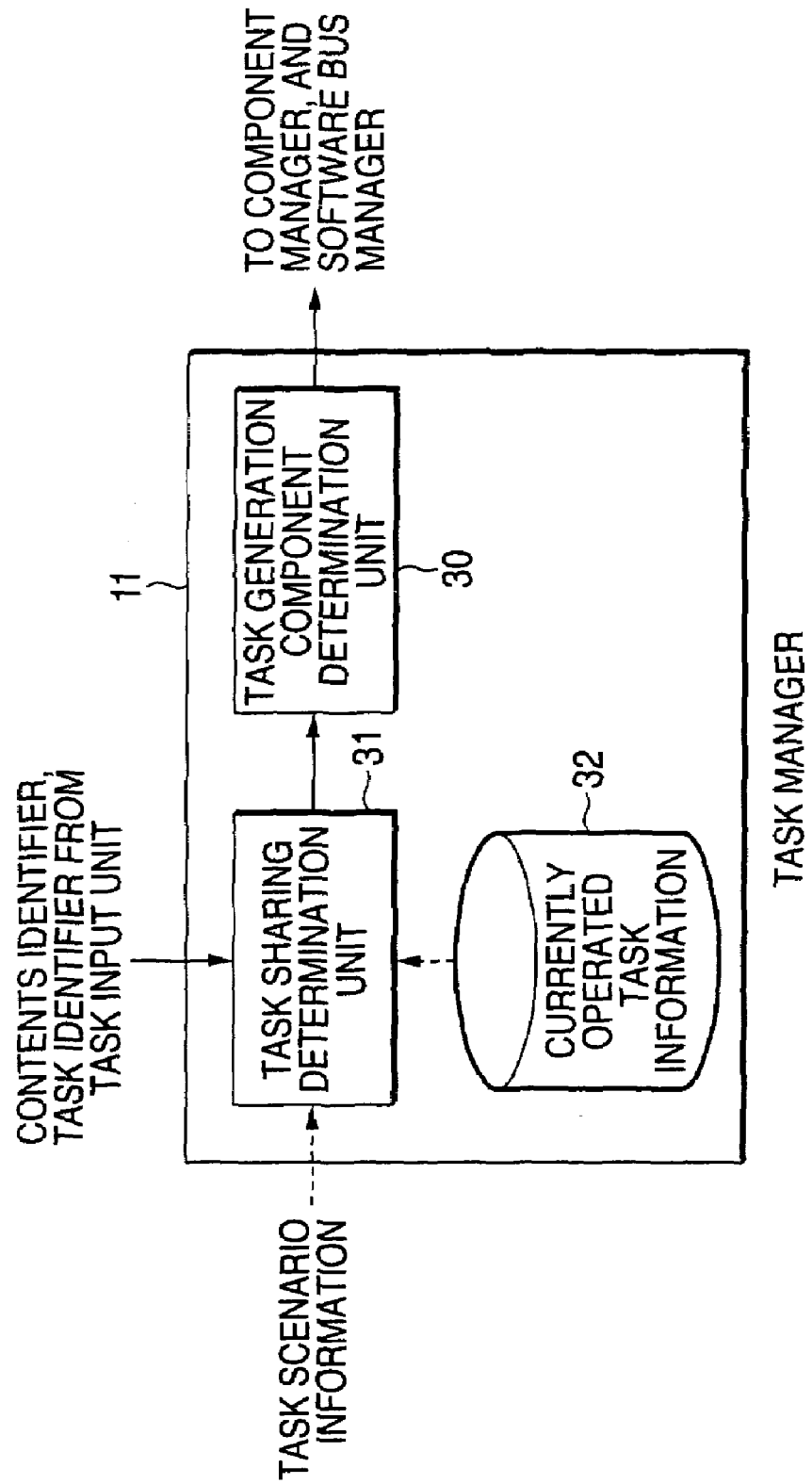

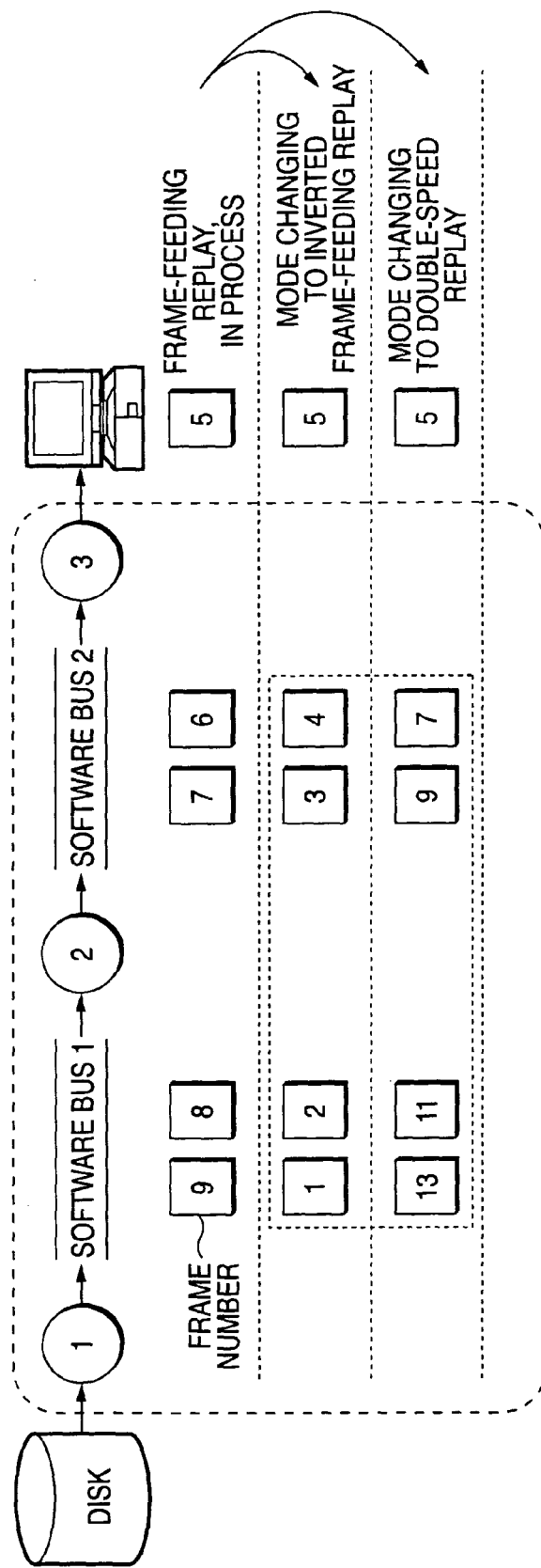

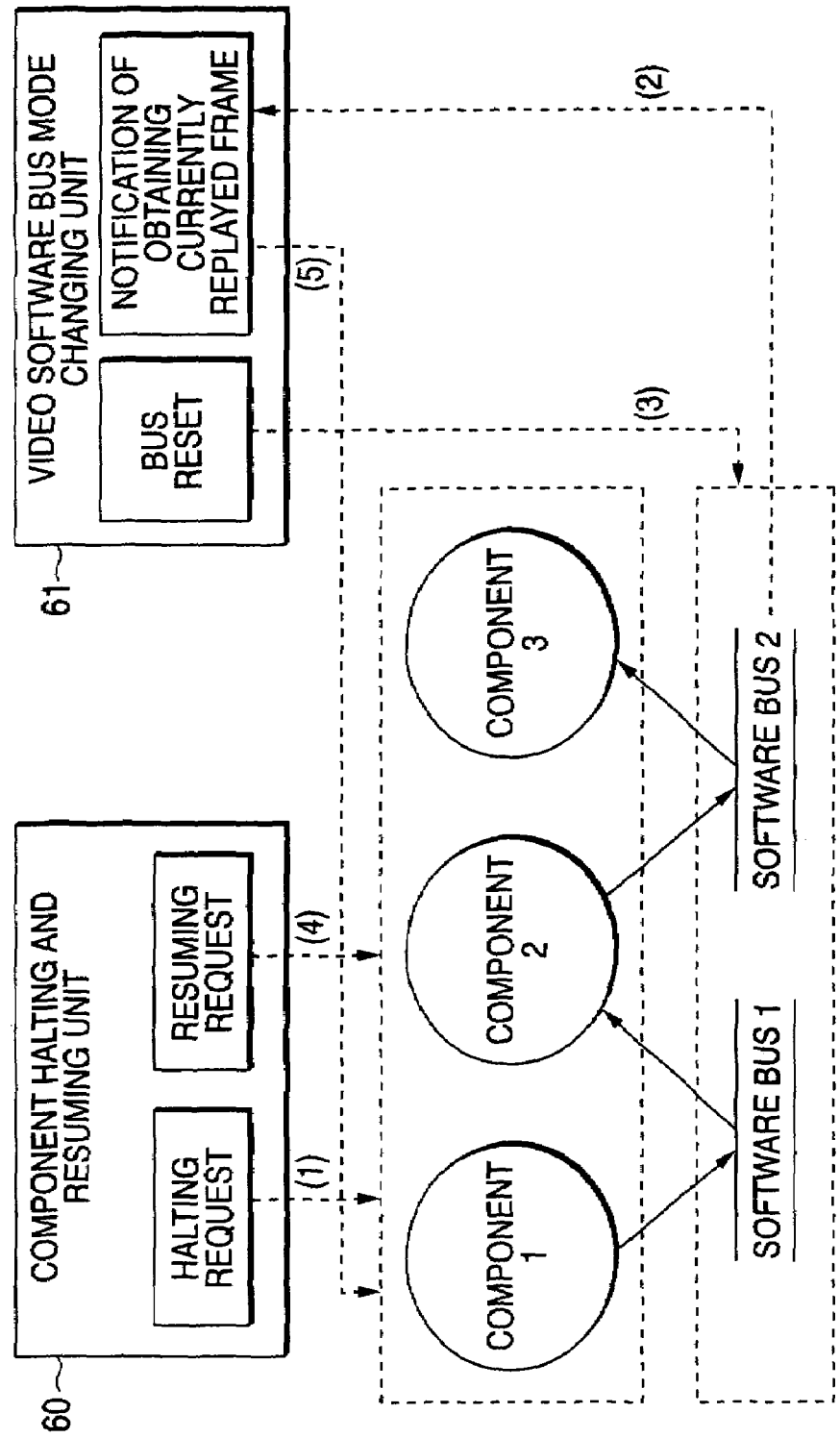

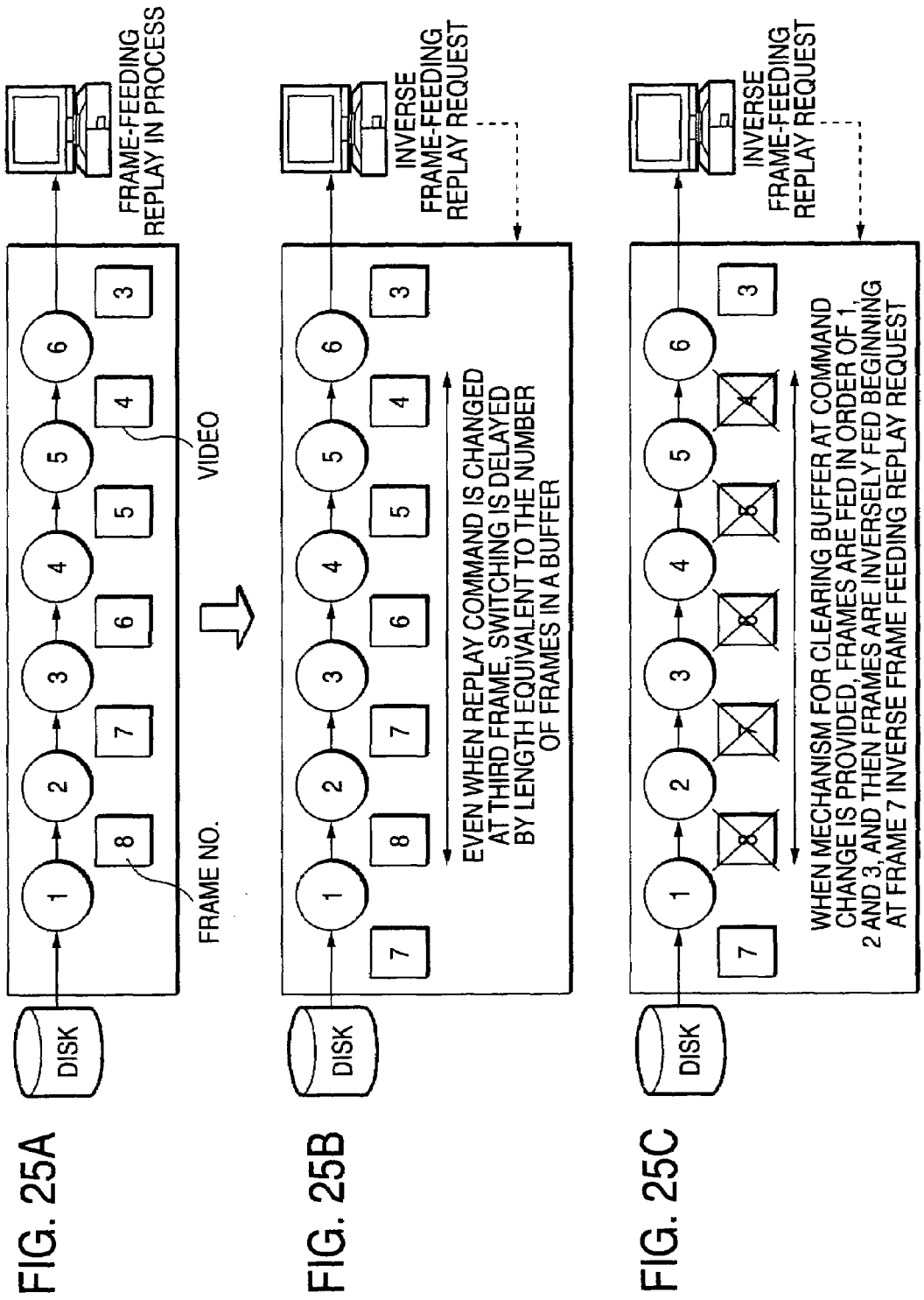

IMAGE PROCESSING DEVICE AND IMAGE PROCESSING METHOD

BACKGROUND OF THE INVENTION

1. Field of the Invention

The present invention relates to an image processing device for performing video image processing, and relates in particular to the implementation of an image processing function that is consonant with the needs of users and the applications they employ.

2. Description of the Related Art

Recently, with the development of advanced digital techniques and network infrastructures, the availability and use has been spreading of video distribution systems that permit various browsers, such as portable terminals and personal computers, to browse video contents on demand or in real time. Such systems are so designed that a server can simultaneously supply multiple video images, and can change the resolutions or the bit rates for the video content in accordance with the conditions encountered on a network, or the specifications for a terminal, and can thereby ensure that continuous, smoothly displayed video will be provided.

However, as a consequence of user demands, the range of the video distribution systems has been broadened, so they cover all systems extending from one for "merely distributing video" to, one for "adjusting a bit rate or converting a format in order to use a relay node to distribute video to another network" or to one "realizing a high level video surveillance in cooperation with an image recognition device". Therefore, the construction of a system is desired that permits functions to be easily extended or customized, so that a system that can quickly cope with and satisfy various needs can be developed within a short period of time.

As a countermeasure, a distributed object technique is proposed that provides for a format converter, resolution converter and an image recognition unit to be treated as independent objects, and an input/output interface and the status shifting shared by all the objects to be defined and managed in order to improve the recycling of the objects. Representative examples of this technique are CORBA (Common Object Request Broker Architecture), devised by OMG (Object Management Group), and COM (Component Object Model), developed by Microsoft Corp.

CORBA is a mechanism whereby the exchange of data by objects is implemented in a distributed environment, while objects created according to the CORBA standards can cooperate to provide, through a network, a single function, even in a remote control environment. COM also implements substantially the same function as does CORBA; and in addition, in order to improve development efficiency, COM automatically extracts objects that can be coupled with other, selected objects, and sequentially links these objects to automatically generate a software function. For example, when an object for reading compressed video from a file is selected, an object for decoding the compressed video and an object for displaying the decoded video on a monitor can be automatically extracted, thereby facilitating the automatic generation of software having a video replay function.

A method for automatically generating software having the video processing function is also disclosed in JP-A-2000-56958. The device that employs the automatic generation method of this software comprises, as is shown in FIG. 27, a storage device 93, for storing multiple software components having input/output augments used to process image data; and an automatic generator 90, for extracting the software components from the storage device 93 in accordance with outline procedures whereby process procedures are written, and automatically generates image processing software. The automatic generator 90 includes: a coupling choice determination unit 91, for determining the input/output relationship between the argument for the software component to be executed first and the argument for the software component to be next executed, and for, when the argument for the software component to be executed first indicates the output and the argument for the software component to be executed next indicates the input, determining that these software components are coupling choices; and a coupling unit 92, for examining the arguments for the software components that are determined, by the coupling choice determination unit 91, to be coupling choices and for determining whether the types of image data to be processed match and for, when the data types match, coupling the arguments for the software components.

FIG. 28 is a diagram showing the coupling relationships of image processing software components used for examining semiconductor defects. Image software components, i.e., alignment, binarization, mask processing and expansion/shrinking components, characteristic value extraction components and determination components are automatically coupled.

When the automatic generation function for this image processing software is provided for the image processing device of the video distribution system, and when a function to be implemented is written to the outline procedure to arbitrarily combine video format conversion, resolution conversion and image recognition software components, a function consonant with the needs of users and the applications they employ.

However, the following problems have arisen when the conventional method is employed to automatically generate image processing software constituting the image processing device for processing images, such as distributed video images.

(Problem 1)

Even for the same parts, behaviors differ, depending on the functions of the image processing device is to be implemented. For example, as is shown in FIG. 23A, when a resolution is to be changed in real time at a video relay node for relaying live video, it is requested that, while regarding real time as important, the resolution be changed by thinning frames in the best effort manner. On the other hand, as is shown in FIG. 23B, when a resolution is to be provided on demand by accumulating camera video in a file and changing the length-to-width ratio and the resolution, it is requested that, while regarding maintenance of content quality as important, the resolution be changed without thinning the frames.

In addition, for the image processing system in the video distribution system, a detailed design, prepared while taking into account the delay and fluctuation of the process for each part, is required for each function to be implemented. In the example in FIG., 23A, consideration must be given to the size of a buffer to be arranged between the video reception component and a resolution change component, so that fluctuation of the network band is absorbed. This buffer size is also varied, depending on the network environment.

These problems, which are not inherent to the individual components, result from functions implemented by the image processing device, and for each of these functions, a data exchange method, such as the size of a buffer arranged between components or a requirement that frames be thinned, must be defined and a mechanism provided, for the image processing device, that can be controlled in accordance with the definition.

(Problem 2)

Assume that multiple video contents are to be provided for multiple users by changing the resolutions or formats. According to the conventional technique, as is shown in FIG. 24, the image processing device changes, in consonance with a user terminal 1, the resolution or the format of a video image input by a camera and provides the obtained image to the user terminal 1, or changes, in consonance with a user terminal 2, the resolution or the format of a video image input by a camera and provides the obtained image to the user terminal 2. However, since for the conversion of the resolution or the format a large number of calculations is required, the processing must be optimized by the common use of the processes that are indicated by portions X (video input process), Y (resolution conversion process) and Z (format conversion process) in FIG. 24.

(Problem 3)

In addition, since a video processing function is an integrating process such as picture synthesization or video/audio multiplexing, an isolation process, such as inverse multiplexing, and a process for changing a parameter for a component are required. Furthermore, to optimize these processes, the image processing device must include a control/management function.

(Problem 4)

Further, when the video replay function is constituted by the same component group, to sequentially replay video images along a time axis while frames are thinned in the best effort manner, or to replay a video image for each frame without the frames being thinned, a rate replay mode and a frame feeding replay mode are provided that can be selected by a user. Therefore the image processing device must include a mechanism for switching replay modes in accordance with a user request.

(Problem 5)

Furthermore, when a replay mode is changed while, to constitute the replay function, a large number of components is employed, either an extended time is required for changing a mode or, from the view of a user, the order in which frames are replayed must be changed.

A specific example of this phenomenon is shown in FIGS. 25A to 25C. In FIG. 25A, frames are read from a disk to a buffer in the forward direction, and frame-feeding replay is performed. Frames 1 and 2 were read from the disk and have already been output from the buffer, while frames 3 and 4 are still retained therein. Suppose that, as is shown in FIG. 25B, a user issues, at the third frame, a request for inverse frame-feeding replay. Based on this request, frame 7 is read from the disk after frame 8. However, since frame 7 is output from the buffer after frames 4, and 8, the change to the inverse frame-feeding replay is delayed a length of time equivalent to the number of frames retained in the buffer.

At this time, even when, as is shown in FIG. 25C, a mechanism is provided for clearing the buffer when a command is changed, the user doubts that the command has been accepted because, after the frames 1, 2 and 3 are fed in that order, frames are invertedly fed in the order 7, 6 and 5 instead of in the order 3, 2 and 1, which the user expects.

(Problem 6)

According to the conventional method for automatically generating the image processing software, software components having input/output arguments (software components that input data required for a process and that output the processing results) are employed together. Therefore, the software component "for receiving a non-compressed image and outputting recognition results", which performs an "image recognition process", can not be employed for a function shown in FIG. 26B (because the type of data output by the "image recognition" software component does not match the type of data input to the "image compression" software component), while it can not be employed for a function shown in FIG. 26A because the type of data output by the "image recognition" software component matches the type of data input to the "recognition results recording" software component). Thus, so that these components can be widely employed, an appropriate method by which all software components can be employed together is requested.

SUMMARY OF THE INVENTION

To resolve these problems, it is one objective of the present invention to provide an image processing device that can easily implement an image processing function consonant with the needs of users and the applications they employ.

To achieve this objective, the present invention provides an image processing device for executing tasks in accordance with task scenario information, said device comprising: task storing means for storing task scenario information indicating components used for a task and coupling information of the components, component information indicating characteristics of the components, and component libraries in which the each component is stored; task analyzing and managing means for analyzing the task scenario information, determining components to use for the task and software buses to use for coupling the components, and managing the execution of the task; component managing means for generating or deleting components, as determined by the task manager, to control the operations performed by the components; and software bus managing means for generating or deleting the software buses, as determined by the task manager, and controlling the exchange of data across the software buses.

According to the image processing device of the invention, the software bus manager is provided to control the exchange of data (information concerning whether frames are to be thinned) by the process-components. Therefore, the task scenario for defining the data exchange method need only be rewritten, so that an image processing device can be provided that has a function consonant with the needs of users and of applications users employ.

The present invention also provides a method for processing images in accordance with task scenario information. The method comprising the steps of: task scenario reading for selecting suitable task scenario information based on task information, contents information, and information of output terminal device and for reading the selected task scenario information; software bus generating for generating software bus based on coupling information of components included in the task scenario information; component reading for reading components designated in the task scenario information from components stored in a component library based on the task scenario information and the component information; component running for setting the read components to run successively in order of mention in the task scenario information; and software bus data controlling for controlling data passing within the software bus so that an output data generated by that a run component processes a content is used as an input data of a next component.

BRIEF DESCRIPTION OF THE DRAWINGS

FIGS. 2A, 2S, and 2C are diagrams showing the roles of the individual image processing units according to the first embodiment.

FIG. 6 is a table showing the data structure of a shared memory according to the first embodiment.

FIG. 7 is a diagram showing the specification for the access management for the shared memory according to the first embodiment.

FIGS. 9A and 9B are diagrams for explaining the use of components in common according to the first embodiment.

FIG. 10 is a diagram showing the structure of a task manager according to the first embodiment.

FIG. 21 is a diagram for explaining the replay process performed by an image processing device according to the third embodiment.

FIG. 22 is a diagram showing the replay process performed by the image processing device according to the third embodiment.

FIGS. 25A, 25B and 25C are diagrams for explaining the problem with the replay system of the conventional image processing device.

Figure 1:
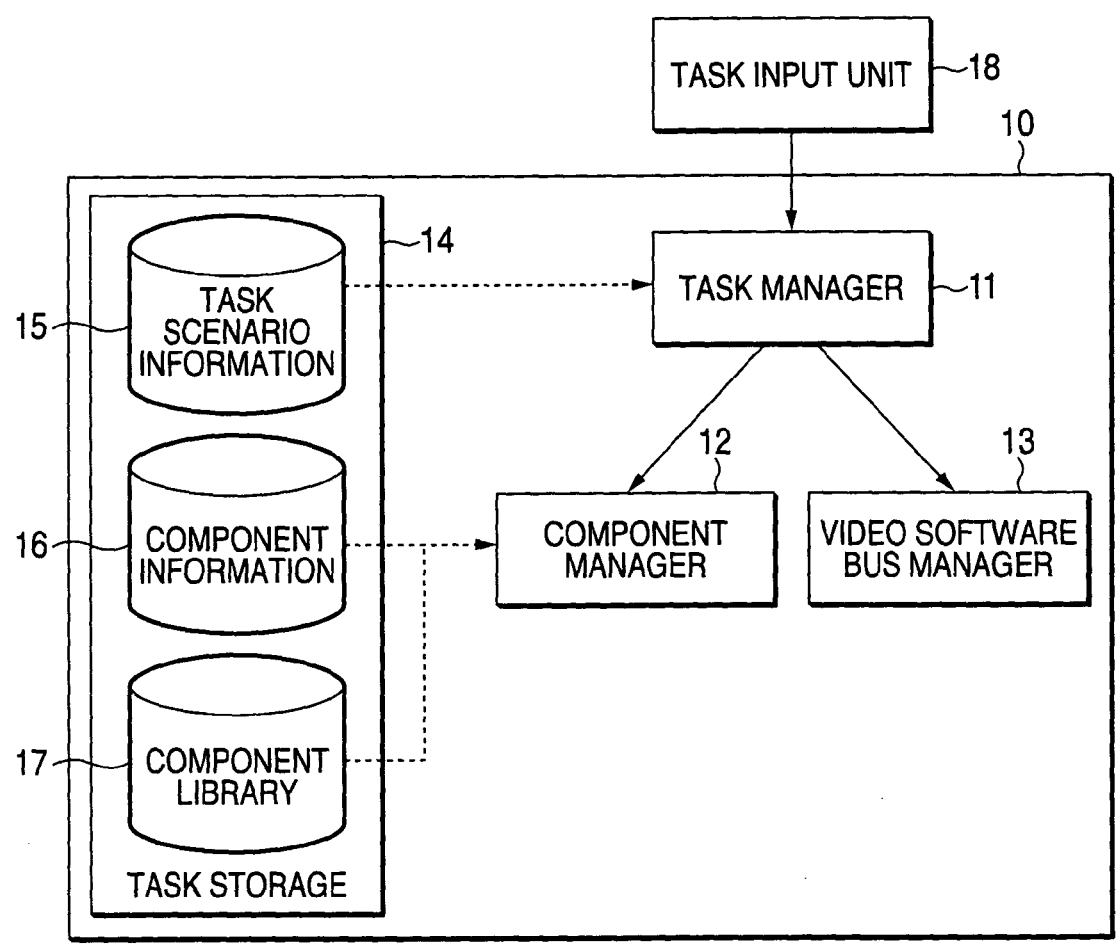
FIG. 1 is a block diagram showing the configuration of an image processing device according to a first embodiment of the present invention.

In the drawings, the reference numeral 10 refers to an image processing device; 11 to a task manager (task analyzing and managing means); 12 to a component manager (component managing means); 13 to a video software bus manager (software bus managing means); 14 to a task storage (task storing means); 15 to task scenario information; 16 to component information; 17 to a component library; 18 to task input means; 21 to a data storage area; 22 to a shared memory; 23 to an access, manager; 30 to task generation component determination unit (task generating component determination means); 31 to a task sharing determination unit (task sharing determination means) 32 to currently operated task information; each of 41 and 42 to a camera; 43 to a microphone; each of 44, 45, and 46 to a terminal; 50 to a component sharing determination unit (component sharing determination means); 51 to a parameter changing unit (parameter changing Leans); 60 to a component halting and resuming unit (component halting and resuming means); 61 to a video software bus mode changing unit (software bus mode changing means); 90 to an automatic generation device; 91 to a coupling choice determination unit; 92 to a coupling unit; and 93 to a storage location.

DETAILED DESCRIPTION OF THE PREFERRED EMBODIMENTS

First Embodiment

An explanation will now be given for the basic configuration and the operation of an image processing device 10 according to a first embodiment of the present invention, and the in-common employment of the processing.

For the contents to be used by the image processing device, a contents identifier for identifying the contents is set up, and for the image processing (task) performed for the contents, a task identifier for identifying a task is set up.

As is shown in FIG. 1, the image processing device comprises task storage 14. In this embodiment, for each task, scenario information 15, which indicates video process-components (software components) that constitute a task and information for coupling the process-components, and a component library 17, in which the substance of each of the video process-components is stored, are managed in the task storage 14, mentioned as "task storage means" in the claims.

Figure 8A:
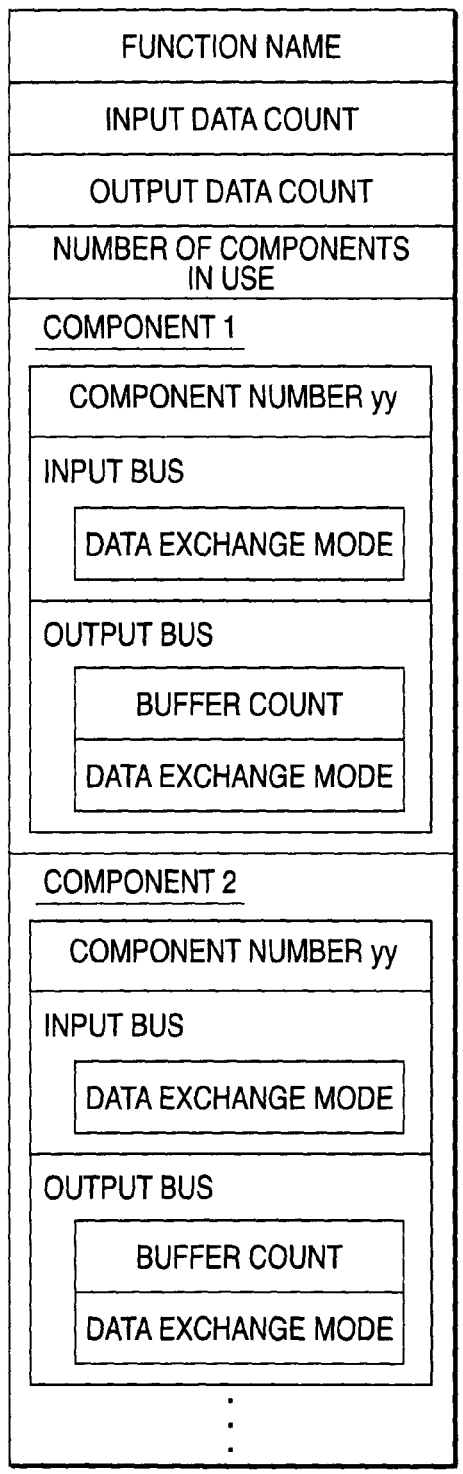
FIG. 8A is a diagram showing the format for task scenario information and FIG. 8B is a diagram showing the format for component information according to the first embodiment.

A function implemented by coupling the components, the order in which the components are coupled, and a method for exchanging data with a buffer (a software bus) that couples the components, e.g., information concerning whether frames should be thinned or not, are entered as the task scenario information 15. Example task scenario information is shown in FIG. 8A.

Figure 8B:
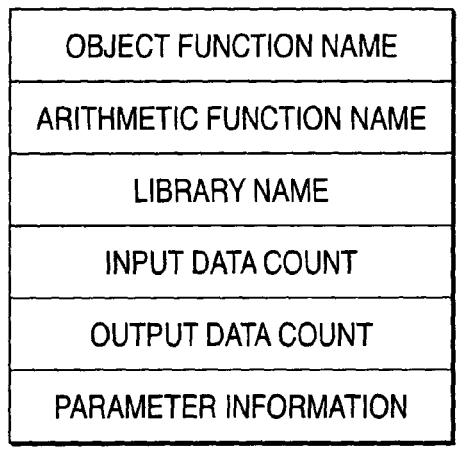

The functions of the components, the name of the component library 17 in which the substance of each of the components is stored, the input and the output data for the components, and the parameter information for the components are entered as the component information 16. Example component information is shown in FIG. 8B.

The image processing device 10 further comprises: a task input unit 18 for receiving a contents identifier for the contents to be processed, and a task identifier for a task for the contents; a task manager 11 for analyzing the task scenario information 15 designated by the input task identifier, for determining which components and software buses are required to execute the designated task, and for managing the task; a component manager 12 for generating or deleting components, as determined by the task manager 11, and for controlling the components; and a video software bus manager 13 for generating or deleting the software buses, as determined by the task manager 11, and controlling the exchange of data across the software buses.

In the claims, the task manager is mentioned as "task analyzing and managing means", the component manager is mentioned as "component managing means", and the video software bus manager is mentioned as "software bus managing means".

FIGS. 2A to 2C are specific diagrams showing the roles of the task manager 11, the component manager 12 and the video software bus manager 13. The task manager 11 analyzes the task scenario information 15 for a task (FIG. 2A), and determines which components (FIG. 2B), software buses (FIG. 2C) and software bus data exchange method are to be used. The component manager 12 examines the component information 16, confirms the locations in the component library 17 whereat the components to be used, as determined by the task manager 11, are stored, and generates pertinent components 1, 2 and 3 and controls the current states of these components. The video software bus manager 13 generates software buses 1 and 2, as determined by the task analysis management unit 11, and controls the method used for the exchange of data by the components 1, 2 and 3.

For the contents designated by the contents identifier, the task manager 11 performs the image processing for the task. When the task has been completed, the task manager 11 instructs the deletion of the components 1, 2 and 3 and the software buses 1 and 2. Based on the instruction, the component manager 12 deletes the components 1, 2 and 3, and the video software bus manager 13 deletes the software buses 1 and 2.

Figure 3:
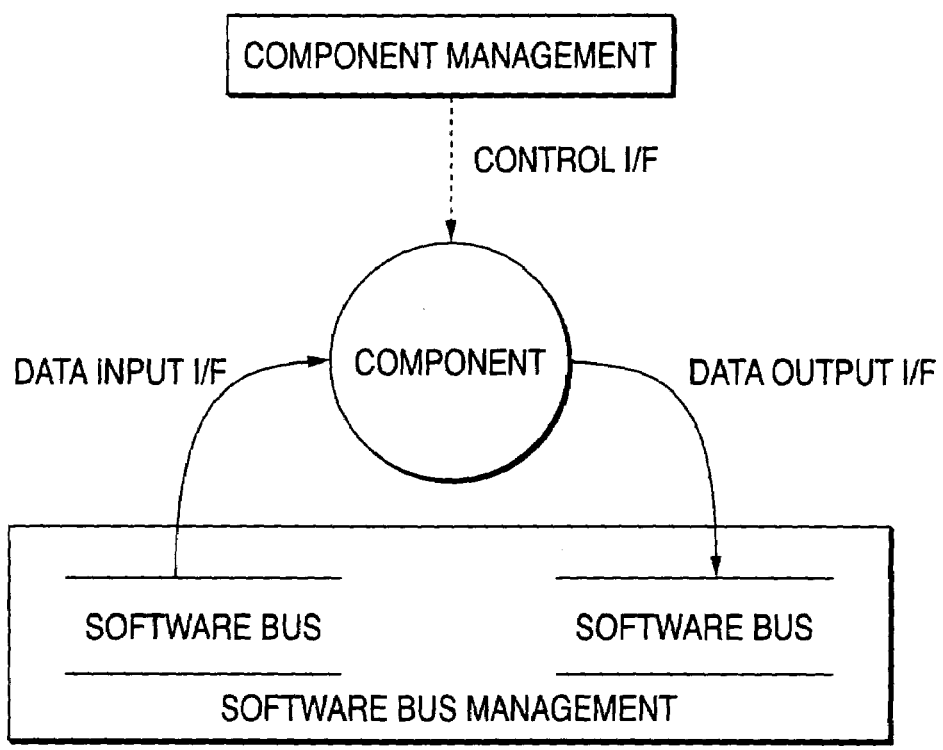
FIG. 3 is a diagram showing the structure of a component according to the first embodiment.
Figure 4:
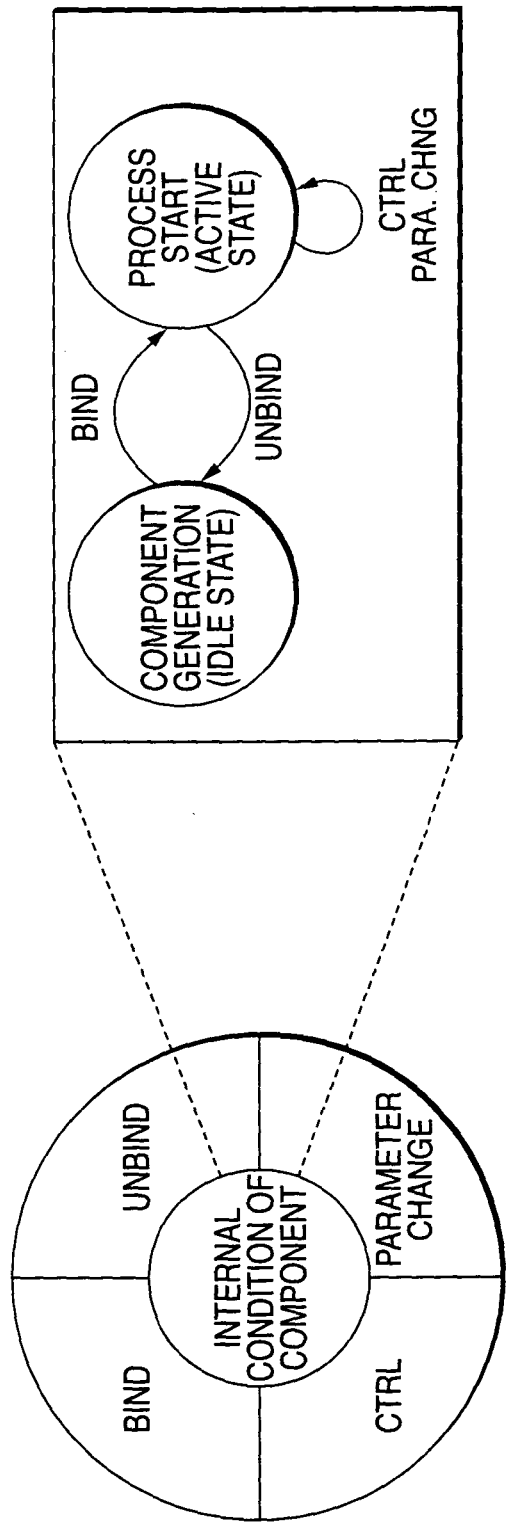
FIG. 4 is a diagram showing the control procedures for a component and the state shifting performed according to the first embodiment.

For the components, as is shown in FIG. 3, a data input I/F (a method for exchanging data with an input bus), a data output I/F (a method for exchanging data with an output bus) and control procedures for the components are defined. As is shown in the example in FIG. 4, the definitions for the control procedures of the components are "BIND (start the access of a software bus)", "UNBIND (halt the access of a software bus)", "PARAMETER CHANGE (parameter change for a component)", "CTRL (control command: e.g., a replay type command, such as Play, Stop or Pause)", When "BIND" is designated, the state of the component is changed from the IDLE state to the Active state (processing is started). When "UNBIND" is designated, the state of the component is changed from the Active state to the IDLE state. Further, when "CTRL" or "PARAMETER CHANGE" is designated, the process in the Active state is initiated. In this manner, when the control procedures and the accompanying state shifting are commonly defined for the components used for video format conversion, resolution conversion and image recognition, which are handled by the image processing device, arbitrary components can be combined in accordance with the needs of a user or of the employed application.

Figure 5:
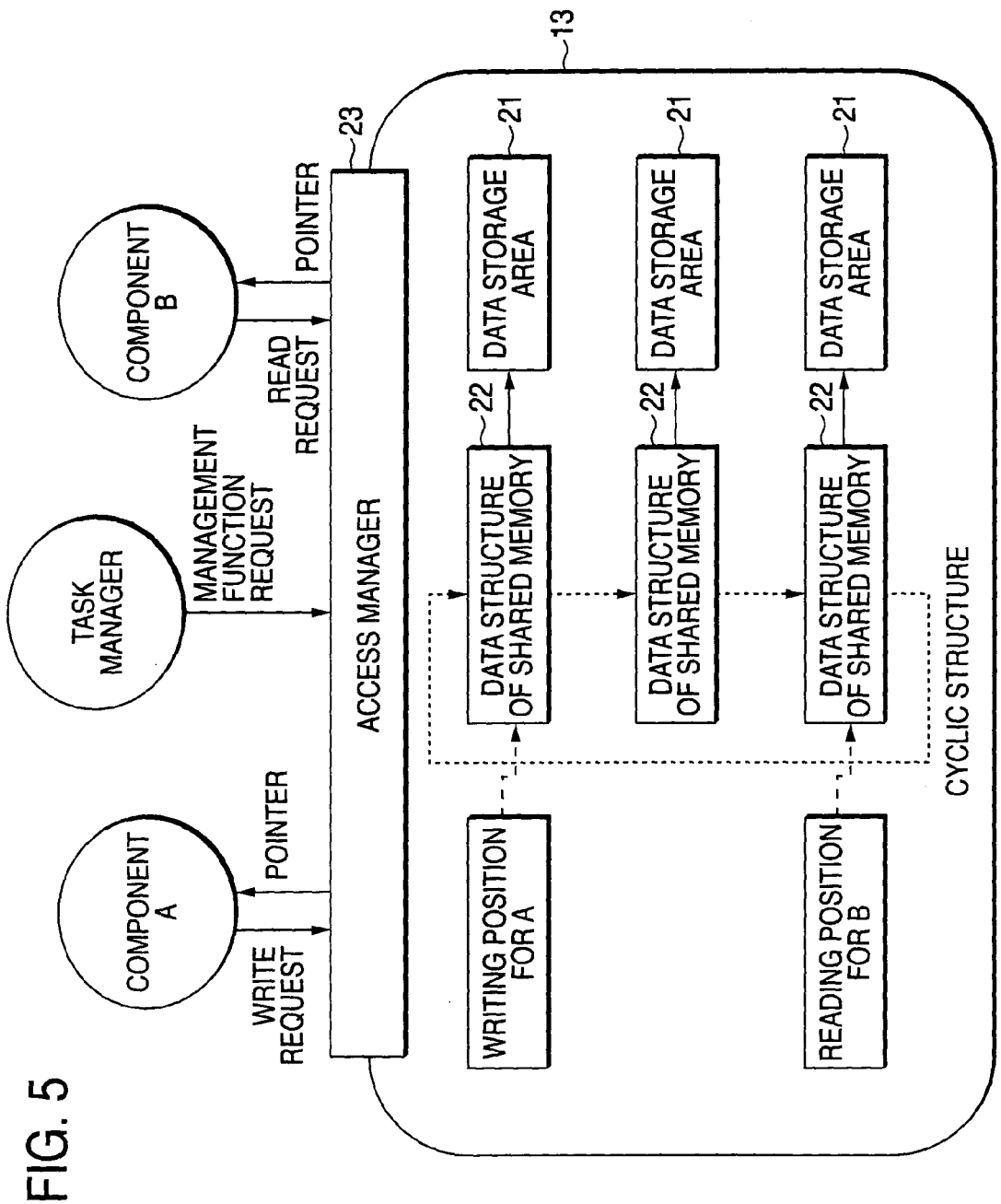
FIG. 5 is a diagram showing a video software bus manager according to the first embodiment.

FIG. 5 is a diagram showing the internal structure of the video software bus manager 13. The video software bus manager 13 includes, as one software bus, a circulating structure composed of multiple common memories 22 including data storage areas 21, and also includes an access manager 23 for managing the writing/reading locations in the common memories 22 and for providing exclusive control.

FIG. 6 is a table showing example data structure formats written to the common memories 22 Stored in this table is all the video component information required to perform the image processing, i.e., a medium form (video/audio), an encoding type, a medium importance level, a medium time code, a medium identifier, a maximum storage size, an actual data storage size and a real data pointer.

The access manager 23 manages the start/end of the generation of the software bus, the writing/reading location of each component, and a method for the exchange is of data by individual components and the software bus.

FIG. 7 is a diagram showing the specifications for a control mechanism to be implemented by the access manager 23.

According to the specifications, for each software bus, only one component is employed for writing, while multiple components can be employed for reading, and writing/reading is not permitted at the same time for a shared memory data structure.

Further, the modes for a. FIFO/LIO reading, b. asynchronous/synchronous writing, and c. asynchronous/synchronous ACK can be set as methods for exchanging data among components.

The mode, a. FIFO/LIO reading, defines how multiple data structures located along the software bus are to be read, and "FIFO reading=transmit data beginning with the oldest data structure" and "LIO reading=constantly transmit the latest data structure" are defined.

The mode, b. asynchronous/synchronous writing, defines a condition for the rewriting of data to the shared memory data structure, and "asynchronous writing=enable rewriting even when reading of a shared memory data structure is not performed" and "synchronous writing=inhibit rewriting until reading of a shared memory data structure is performed" are defined.

The mode, c. asynchronous/synchronous ACK, defines a response method when data reading/writing relative to the software bus is inhibited, and "asynchronous ACK=immediately notify a component of inhibition of reading/writing" and "synchronous ACK=transmit no response until reading/writing process is enabled" are defined.

As is described above, since for each component a detailed data exchange method can be set that is controlled by the access manager 23, differences in the data exchange methods used for the individual components need not be, identified.

Furthermore, as task manager 11 control commands, requests are issued for a bus reset (initializing an access point for each component and resetting the bus using a designated parameter (FIFO/LIO reading, asynchronous/synchronous writing or asynchronous/synchronous ACK)), and for the acquisition of the latest reading position (obtaining information concerning the storage locations in the shared latest memory structure for which data reading has been performed).

Through this processing, the task manager 11 can control the data exchange method for each component.

Further, the detailed data exchange method for each component is set in this manner.

The component for writing data to the software bus issues a write request to the access manager 23, and starts writing data upon the reception of a notification, from the access manager 23, designating a write position pointer. The component employed for reading data from the software bus then issues a read request to the access manager 23 and starts the reading of data upon the reception of a notification, from the access manager 23, designating a read position pointer.

Since the thus arranged video software bus manager 13 is provided, each component can add, to the input data, the results obtained through the component process and can output the resultant data. As a result, functions consonant with various needs can be implemented.

For the task scenario information in FIG. 8A, the mode for exchanging data with the input bus is defined for component 1, and the number of buffers for the output bus and the data exchange mode are defined for component 2. In a case wherein only components 1 and 2 are present, or in a case wherein components 1 and 2 are those located at both ends of the task, these definitions are not required.

An explanation will now be given for a method that permits tasks to use a component in common.

FIGS. 9A and 9B are diagrams showing an example wherein, when a task 2 for processing video images obtained by a camera is started while a task 1 is running (FIG. 9A), "video input" and "format conversion" components are shared by the tasks. The internal state of the image processing device at this time is shown in FIG. 9B. The "video input" and "format conversion" components are employed in common by the tasks 1 and 2, and the resolution conversion component for the task 1 and the terminal output component for the task 2 receive data from the software bus 2 that is used to output the process results, obtained by the format conversion component.

FIG. 10 is a diagram showing the structure of the task manager 11 for automatically providing for the sharing of the components. The task manager 11 includes: a task sharing determination unit 31, for examining the task information 32 that is currently being processed, and for determining which components can be shared with a task that is newly started; and a task generation component determination unit 30, for determining a video software bus and components, other than those that can be shared, that should be generated.

When the contents identifier and the task identifier are received from, the task input unit 18, the task sharing determination unit 31 examines the task information 32 that is currently being processed, and finds, among the tasks currently being run, a task that is processing the contents designated by the input contents identifier. Then, beginning with the upstream component that constitutes the pertinent task, the task sharing determination unit 31 determines whether the component and the parameter match, and regards, as the components for which the processing can be shared by the tasks, those components that it is ascertained match the parameter. Further, only for those components for which the processing can not be shared, the task generation component determination unit 30 determines which necessary components and video software bus to generate.

Figure 11:
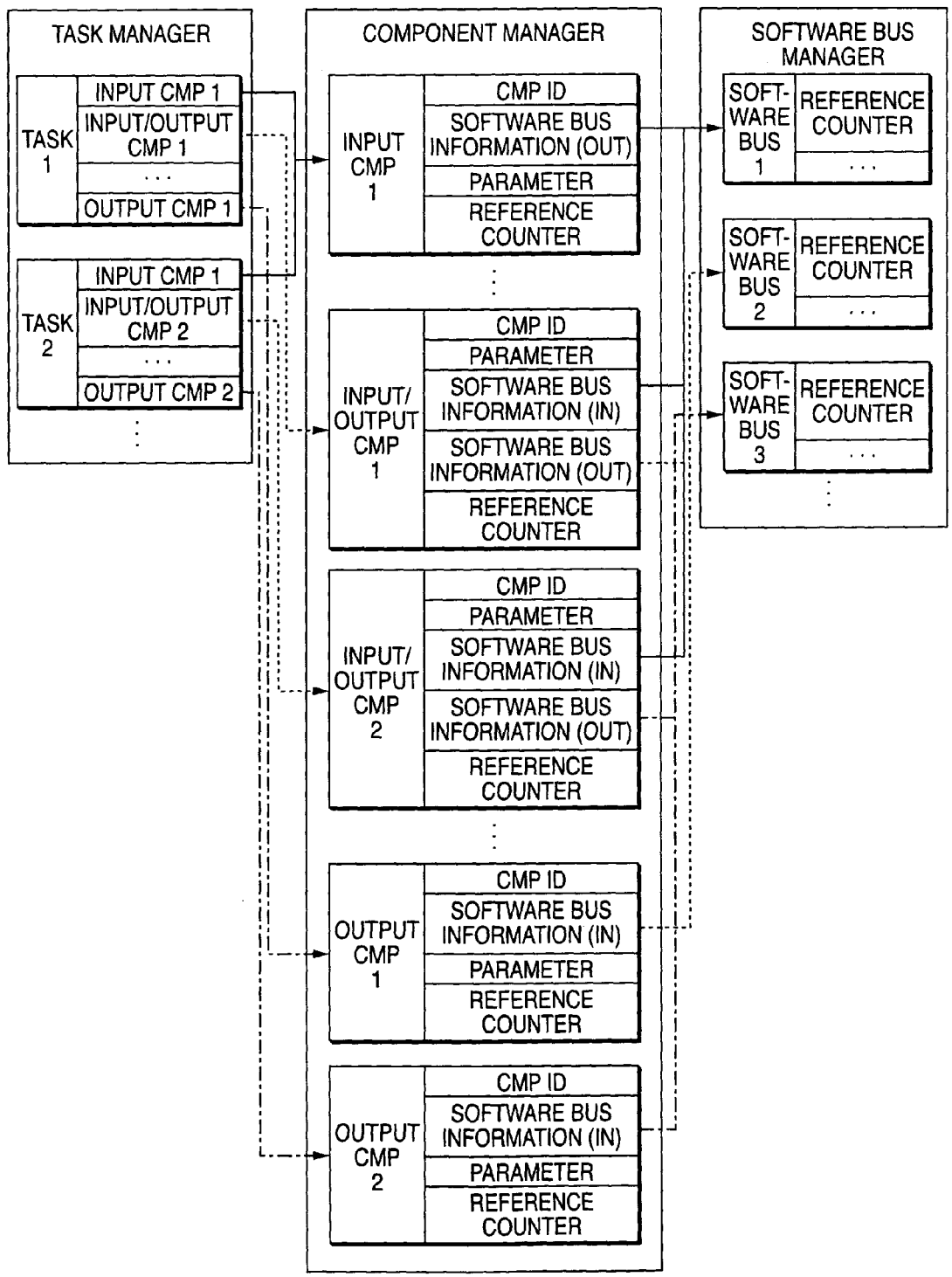
FIG. 11 is a diagram showing management tables for the task manager according to the first embodiment.

FIG. 11 is a diagram showing the internal data management structure of the task manager 11. The task manager 11 manages data stored in a "task management" area, a "component management" area and a "software bus management" area.

In the "task management" area, information (path to input, input/output, and output components (CMP)) for each task that is currently being run by the image processing device is managed. One input CMP and one output CMP are always required, while an arbitrary number (0 to N) of input/output CMPs may be provided.

In the "component management" area, information for the input, input/output, and output components that constitute the task, i.e., a component identification number, a parameter, software bus information and a reference counter, are managed. The software bus information is information used to access the software bus, and the value of the reference counter represents the number of tasks that employ the component.

In the "software bus management" area, the software bus information used by the components, i.e., a reference counter, a data exchange method for each component and the number of buffers, are managed. The reference counter value represents the number of components that are accessing the software bus.

In FIG. 11, the task 1 and the task 2 employ the component input CMP1 in common. In this case, a "CMP ID" of the component input CMP1 is entered in the input CMP of the task 1 and the input CMP of the task 2 in the "task management" area.

Since the component input CMP1 is employed in common, the software bus information (OUT) for the component input CMP1, the software bus information (IN) for the component input/output CMP1 used by the task 1, and the software bus information (IN) for the component input/output CMP2 used by the task 2 are matched, and the same information as that for the software bus 1 is written.

When the component is employed in common in this manner, the number of calculations required for the image processing device can be reduced.

The task generation processing performed by the image processing device will now be described.

1. Determination of a Branching Position

When an input component for a task to be newly generated (a new task) is already present in the "component management" area, a task (a currently running task) having the same input component is extracted from the "task management area".

Then, beginning with the input component, the count N (an integer) whereat the same input/output component is continued between the new task and the extracted, currently running task is calculated. This process is performed a number of times equivalent to the number of the tasks that are currently running, and the point whereat the maximum M is obtained is determined as a branching point whereat the new task branches off from the current task.

When the same contents identification number is provided for the tasks and the components and parameters Latch, it is ascertained that the input/output component is identical. However, there is a case wherein, even among the same components, the software bus information (the number of buffers and the data exchange mode) output by the components differs, depending on the task. Therefore, all or part of the software bus information output by the component can also be additionally employed for this determination.

2. Updating of the Reference Counters for the Disposed Components Up to the Branch Point The components disposed up to the branch point are extracted from the "component management" area, and the reference counter values of the components are incremented.

3. Generation of Components and Software Buses Following the Branch Point

The components following the branch point are added to the "component management" area, and the software buses connecting the components are added to the "software bus management" area. Then, the components and the software buses that have been added are generated, and the connection of these components to the software buses is started. It should be noted that the reference counters for the components following the branching point are set to 1.

The task ending processing winnow be described.

1. Determination as to Whether a Component can be Deleted

For the input, the input/output and the output components for a task to be terminated, the values of the reference counters in the "component management" area are decremented, and a component for which the reference counter value has reached 0 is determined to be a component that can be deleted.

2. Ending of a Connection to a Software Bus, and Deletion the Software Bus

The connection of software to a component that can be deleted is ended. Thereafter, the reference counters in the "software bus management" area are decremented, and the software bus for which the reference counter has reached 0 is deleted.

3. Terminating of a Component

A component for which the reference counter in the "component management" area has reached 0 is terminated.

As is described above, the image processing device employs, the task scenario information to define the buffer size for each component and the data exchange method, such as information as to whether or not frames should be thinned, and further, a mechanism is provided that permits the video software bus manager to control the bus connecting the components. Therefore, only the rewriting of the task scenario information need be performed, so that components for video format conversion, for resolution conversion and for image recognition can be arbitrarily combined to dynamically implement a desired function, without recompiling being required.

Furthermore, when a component, such as a resolution conversion component or a format conversion component, that requires a large number of calculations is employed by multiple tasks, the components that can be shared by the tasks can be automatically shared, and the process can be optimized. As a result, the entire number of calculations can be reduced.

Figure 26A:
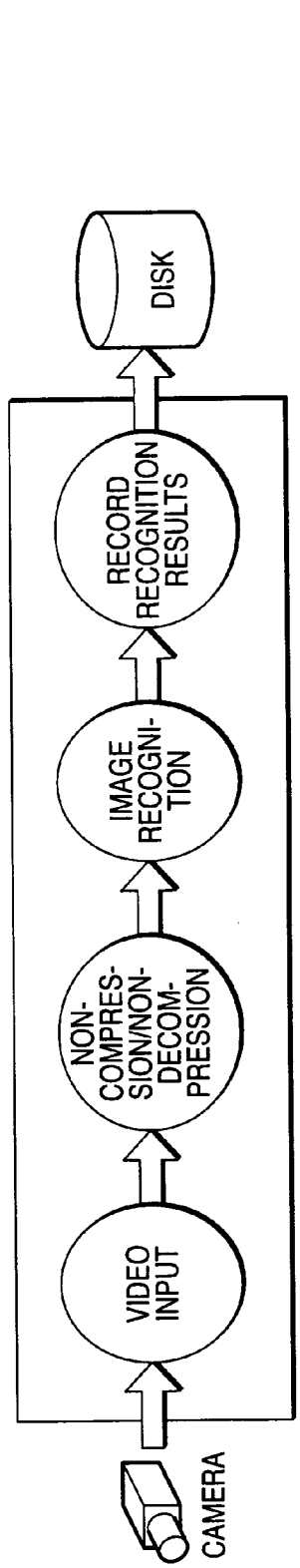
FIGS. 26A and 26B are diagrams for explaining the problem with a software component combination of the conventional image processing device.
Figure 26B:
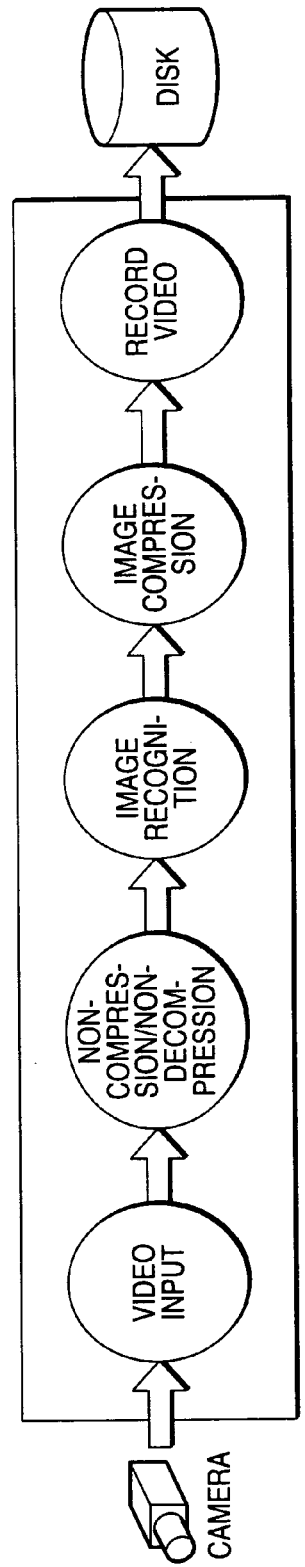
Figure 27:
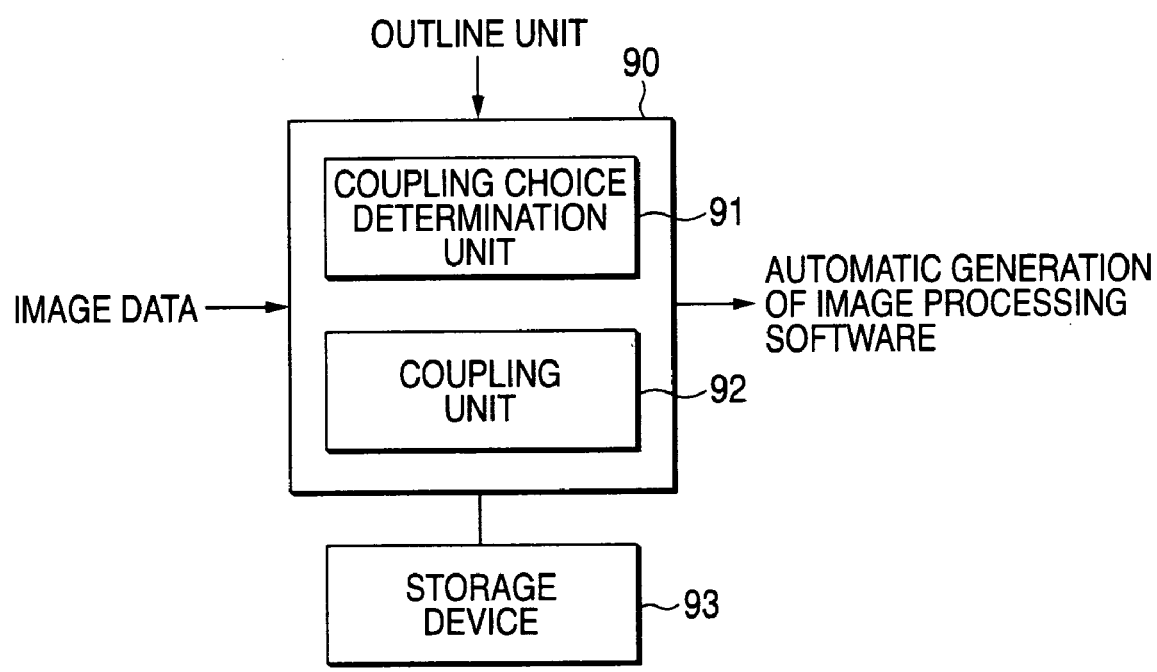
FIG. 27 is a block diagram showing the structure of a conventional automatic image processing software generation device.
Figure 28:
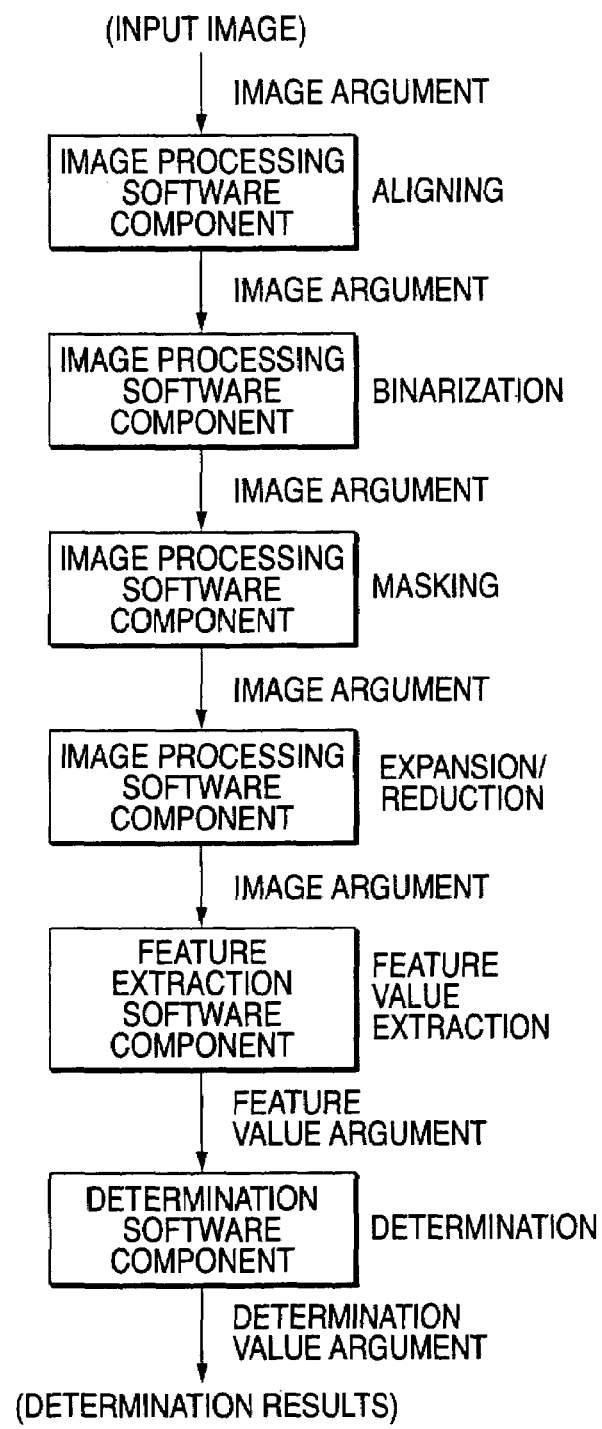
FIG. 28 is a diagram showing software components generated by the conventional automatic image processing software generation device.

In addition, since the video software bus manager manages the exchange of data along the software bus, part of the data output by the component can be selected and transmitted to a downstream component. Therefore, each component can output the obtained results, together with the received data, through the process For example, in the task shown in FIG. 26B, the image recognition component receives non-compressed/non-decompressed image data, performs image recognition for the data, and outputs to the software bus (non-compressed/non-decompressed image data+image recognition results). From among these received data, the video software bus manager outputs the non-compressed/non-decompressed data to the succeeding image compression component, and outputs the image recognition results to the following video recording component. The image compression component compresses the non-compressed/non-decompressed image data, and transmits the resultant data to the video recording component, which in turn stores, on a disk, the compressed image data and the image recognition results.

Since the video software bus manager is provided, a mechanism can be constructed that, as on a manufacturing line, extracts only the necessary data portion, and adds the currently obtained results to the results obtained by the upstream process.

Furthermore, according to the image processing device of the invention, information as to which object function of which component library 17 is the currently employed component can be written to the component information 16. Therefore, when a new component library is created by using the UNIX (trademark)/Linux load library or the Windows (trademark) dynamic load library (DLL), and the component information is simply added, the new component can be registered, while recompiling is not required for the image processing device.

Moreover, when the task storage 14 periodically reads the task scenario information 15, and determines whether the components that constitute the task have been coupled correctly, an error can be detected for the task scenario information that is written manually.

Second Embodiment

For a second embodiment of the present invention, an explanation will be given for the path integrating process, accompanied by picture synchronization and video/audio multiplexing, the path isolation process, accompanied by inverse multiplexing, and a process for changing the parameters for components.

Figure 12:
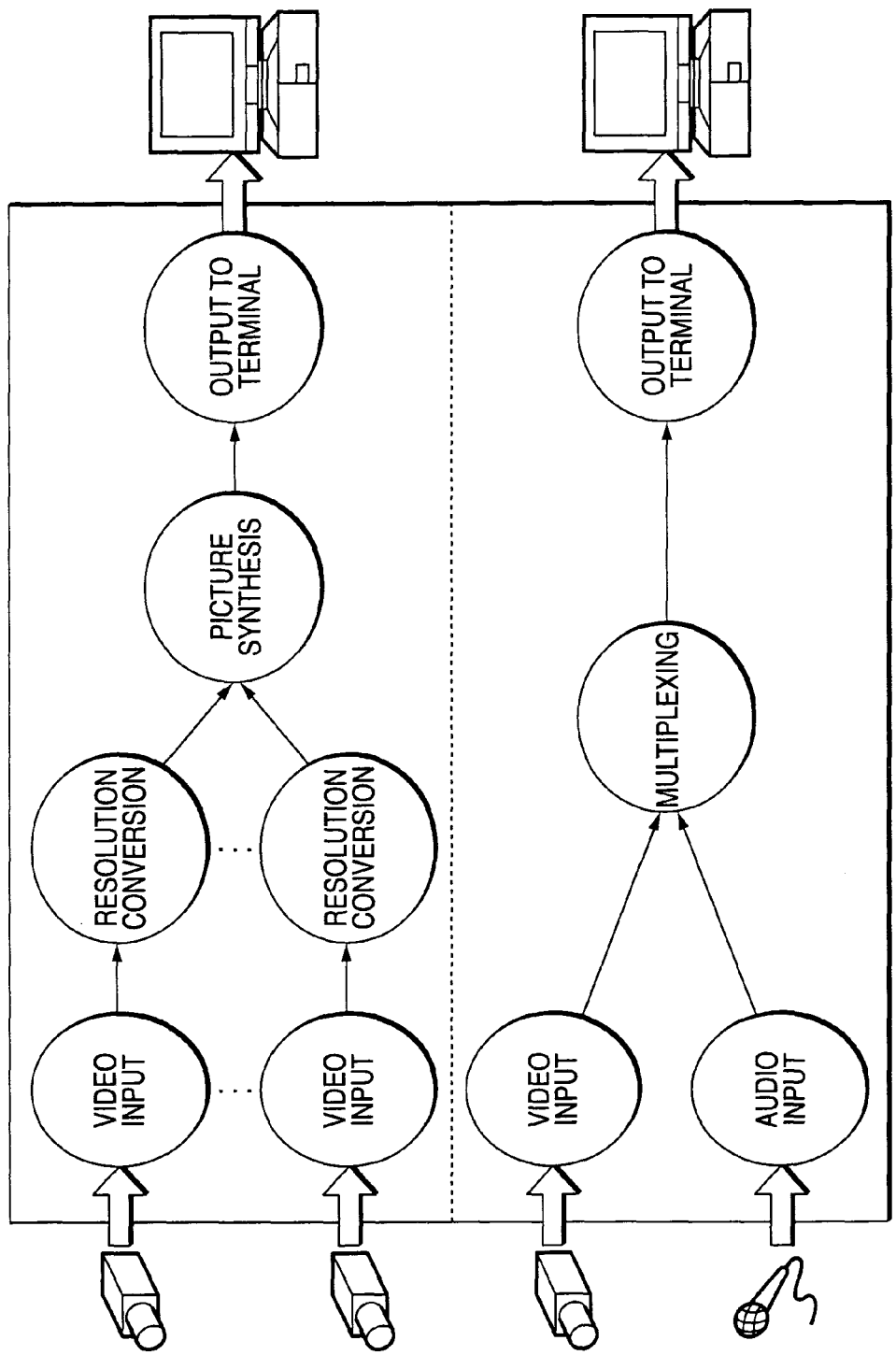
FIG. 12 is a diagram showing a path integrating process performed by an image processing device according to a second embodiment of the present invention.

First, the path integrating process will now be described. As is shown in FIG. 12, the path integrating process can be performed when images obtained by multiple cameras are synthesized and the synthesis image is output to one terminal, or when an image obtained by a camera and sounds received through a microphone are multiplexed and the results are output to one terminal.

Figure 13:
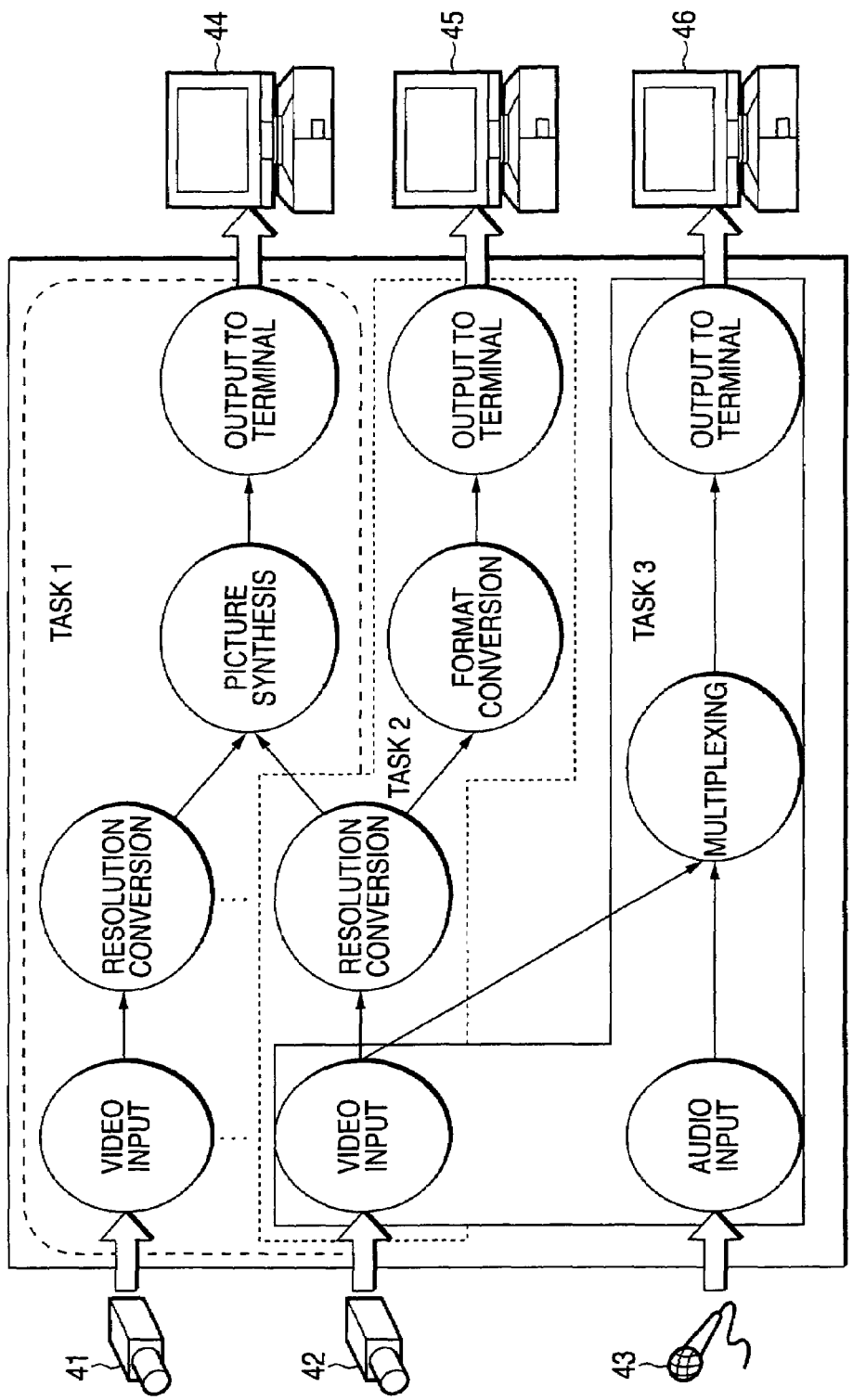
FIG. 13 is a diagram showing the process for sharing components, including the path integrating process, according to the second embodiment.

FIG. 13 is a diagram showing an example wherein components, including the component for performing the path integrating process, are employed in common. In this example, an image obtained by a camera 41 and an image obtained by a camera 42 are synthesized, and the synthesized image is output to a terminal 44 (task 1); the image obtained by the camera 42 is independently output to a terminal 45 (task 2); and the image obtained by the camera 42 and the sounds received through a microphone 43 are multiplexed and the results are output to a terminal 46 (task 3). The video input component for the camera 42 is employed in common by the tasks 2 and 3, and the video signal resolution conversion component for the camera 42 is employed in common by the tasks 1 and 2.

Figure 14A:
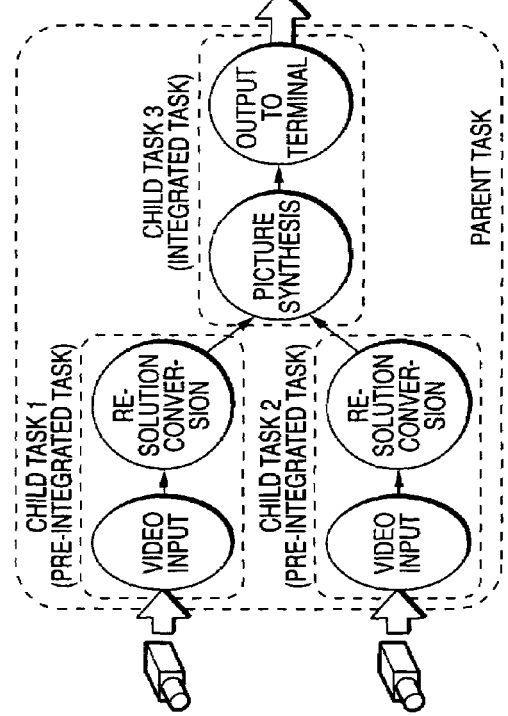
FIGS. 14A and 14B are a diagram and a flowchart showing the path integrating process according to the second embodiment.

For the management provided by the management unit 11 for the task scenario information and the task analysis, as is shown in FIG. 14A, the overall task of integrating the paths is regarded as a parent task, which is constituted by multiple child tasks before integration and a single child task after integration.

Figure 14B:
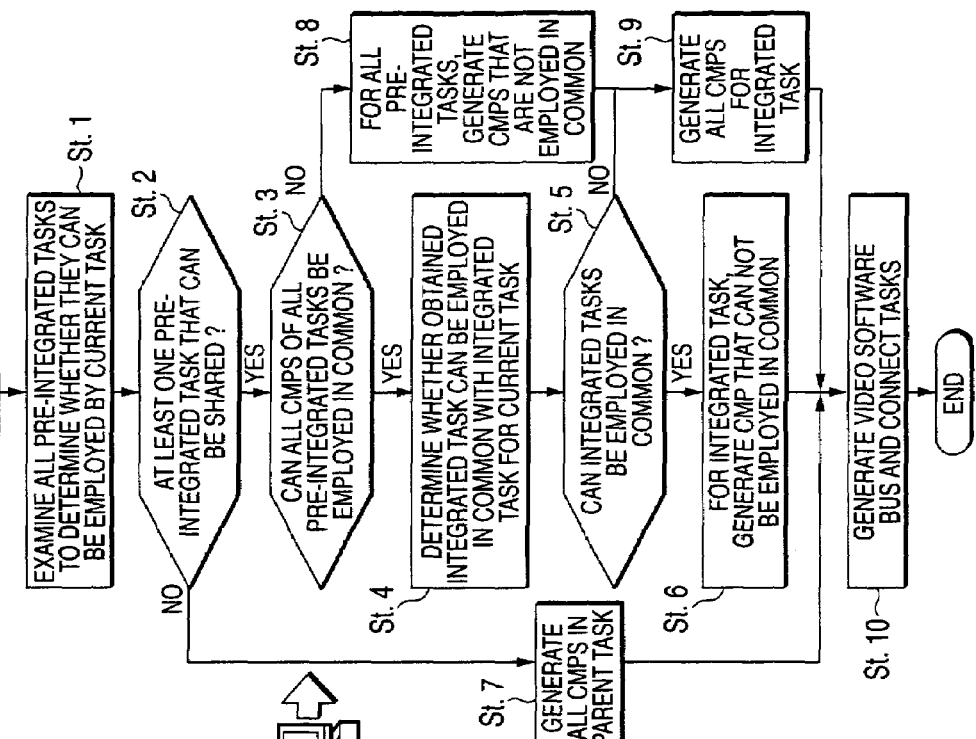

FIG. 14B is a flowchart showing the processing performed by the task manager 11 to integrate paths, while employing the components in common. In this processing, the "currently running task" represents a normal task that does not integrate paths, and does not include the parent task.

step 1: All the pre-integration tasks are examined to determine whether they can be employed in common with a currently running task.

step 2: When there is at least one pre-integrated task that can be shared, step 3: a check is performed to determine whether the components of all the pre-integration tasks can be employed in common. When the decision is YES, step 4: In order to further find a sharing possibility, a check is performed to determine whether the integrated tasks in the currently running task can be employed in common.

step 5: When the integrated tasks can be employed in common, step 6: a component that can not be employed in common by the integrated tasks is generated.

When the decision at step 3 is No, step 8: components that can not be employed in common are generated for all the pre-integrated tasks.

step 9: All the components for the integrated tasks are generated.

When at step 5 the integrated tasks can not be employed in common, all the components for the integrated tasks are also generated (step 9).

When at step 2 there is no pre-integrated task that can be employed in common, step 7: all the components in the parent task are generated.

step 10: Finally, the video software buses are generated and the paths are integrated.

The end process for the task for which the paths are integrated is performed in the same manner as the end process explained for the first embodiment.

Figure 15:
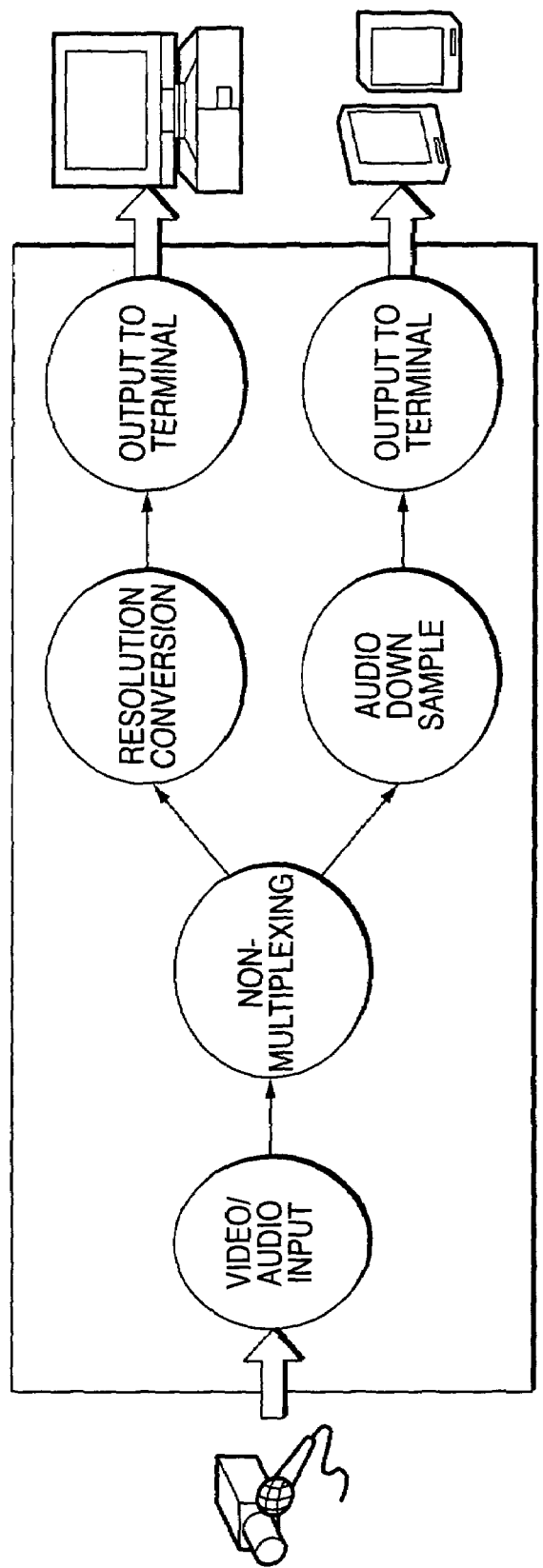
FIG. 15 is a diagram showing a path division process according to the second embodiment.

The path isolation process will now be described. As is shown in FIG. 15, the path isolation process is performed to separate video images and sounds that are multiplexed, and to output the obtained video images and the sounds to a video device and an audio device.

Figure 16:
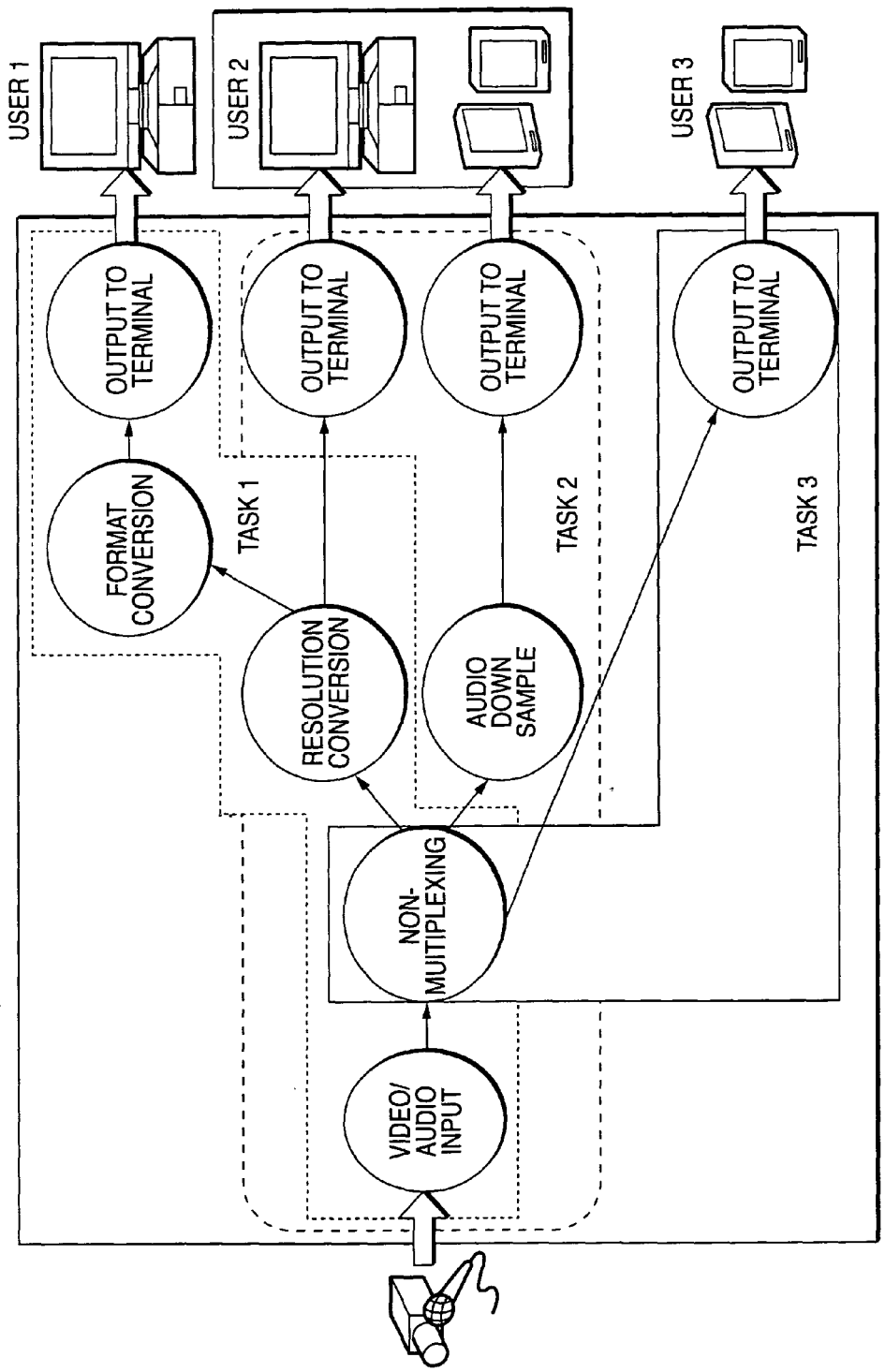
FIG. 16 is a diagram showing the process for sharing components, including the path division process, according to the second embodiment.

FIG. 16 is a diagram showing an example wherein the components are employed in common during the path isolation and division process. In this example, a video/audio multiplexed signal is separated into images and sounds, and the images and sounds are output to a video device and an audio device of a user 2 (task 1); only a video signal is separated from the input signal, and is output to a video device of a user 1 (task 2); and only an audio signal is separated from the input signal, and is output to an audio device of a user 3 (task 3). A video/audio input component for receiving a multiplexed signal, and a non-multiplexing component for separating the multiplexed video/audio signal are employed in common by the task 1, the task 2 and the task 3, while a component for converting the resolution of a video signal obtained by a camera 42 is employed in common by the task 1 and the task 2.

Figure 17B:
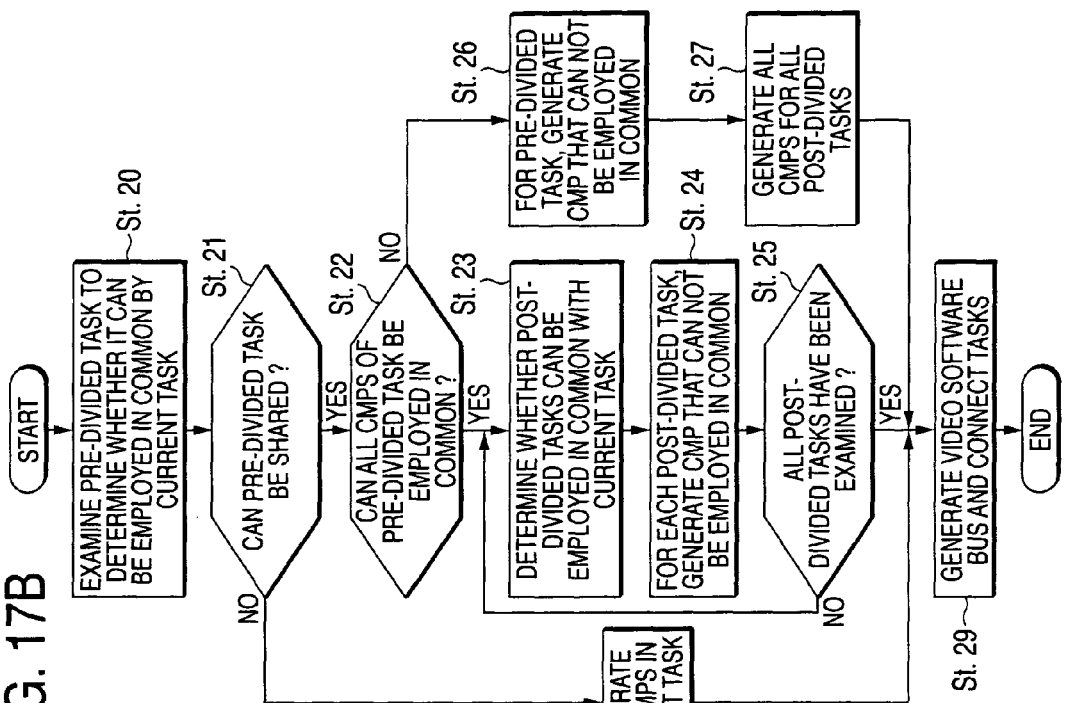
FIGS. 17A and 17B are a diagram and a flowchart showing the path division process according to the second embodiment.
Figure 17A:
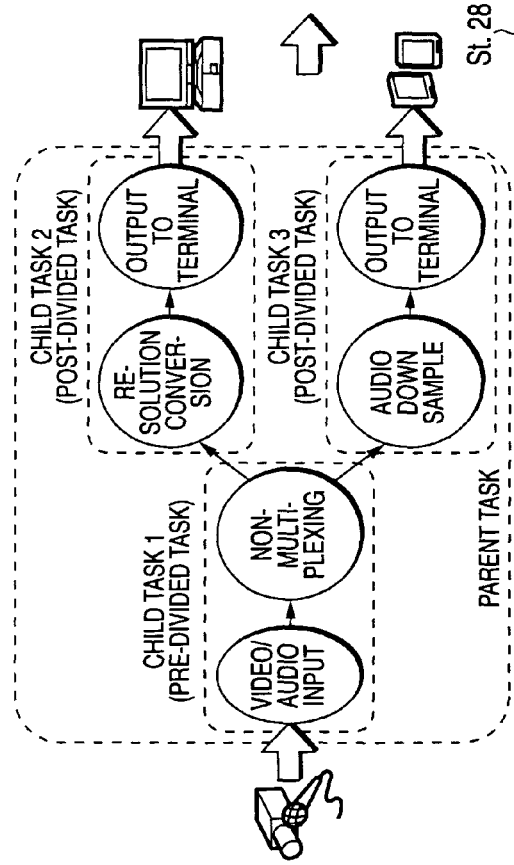

Further, as is shown in FIG. 17A, for the management provided by the management unit 11 for the task scenario information and the task analysis, the total task for which the path is separated is handled as a parent task that is constituted by multiple pre-separated child tasks and post-separated child tasks.

For the image processing device of this embodiment, a task, as is shown in FIG. 17A, that is constituted by a pre-separated child task 1 and a post-separated child task 2 (e.g., a task for inversely multiplexing a video/audio signal and changing the resolution of only the video signal, and for transmitting the obtained signal to the terminal), is regarded not as a normal task, but as a task for dividing a path.

FIG. 17B is a flowchart showing the processing performed by the task manager 11 to divide a path. In this processing, the "currently running task" is a pre-integrated or post-integrated child task, a pre-separated or post-separated child task, or a normal task for which the integration of paths is not performed. The parent task is not included as the currently running task.

step 20: A check is performed to determine whether a pre-separated task can be employed in common with a currently running task.

step 21: When the pre-separated task can be employed in common, step 22: a check is performed to determine whether all the components of the preseparated task can be employed in common. When the decision at step 22 is YES, step 23: a check is performed to determine whether each post-separated task can be employed in common with the currently running task.

step 24: Then, a component that can not be employed in common is generated for each post-separated task.

step 25: The process at steps 23 and 24 is repeated until all the post-separated tasks have been examined.

When the decision at step 22 is NO, step 26; A component that is not employed in common is generated for the pre-separated task.

step 27: All the components for all the post-separated tasks are generated.

When at step 21 the pre-separated task can not be employed in common, step 28: all the components in the parent task are generated.

step 29: Finally, the video software bus, is generated and the paths are integrated.

The end process for the task for which the path isolation process has been performed is performed in the same manner as the end process explained for the first embodiment.

An explanation will now be given for the processing for changing the parameter for a component that is employed in common.

There are a parameter, such as the one for improving the image quality accuracy for the resolution conversion, that can be changed while affecting another task, and a parameter, such as the vertical-horizontal ratio for resolution conversion, that should be changed for each task without affecting another task.

In the process for changing the parameter for the component shared by the tasks, a "parameter that can affect another task" is changed while the use in common of the component is continued. For an "inherent parameter that should be changed for each task", a new component must be provided and a task must be re-generated.

Figure 18A:
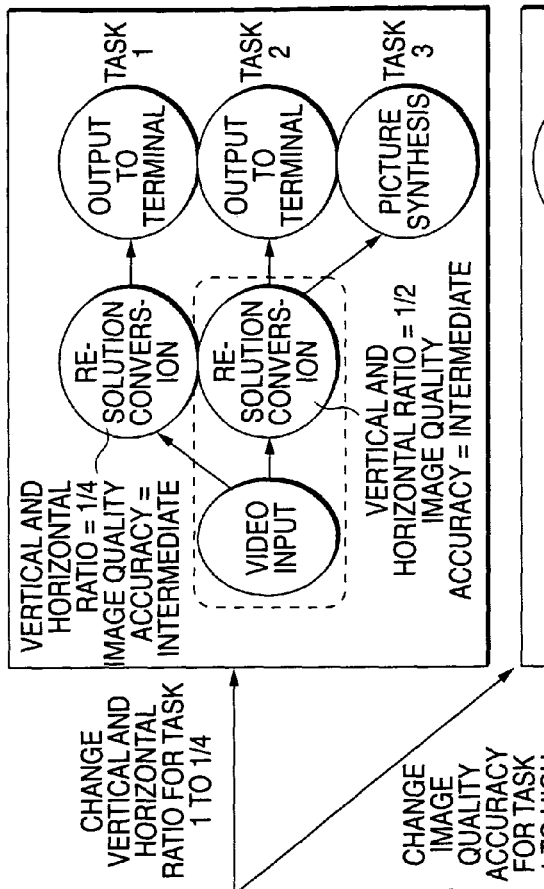
FIGS. 18A, 18B and 18C are diagrams showing the parameter changing process according to the second embodiment.
Figure 18B:
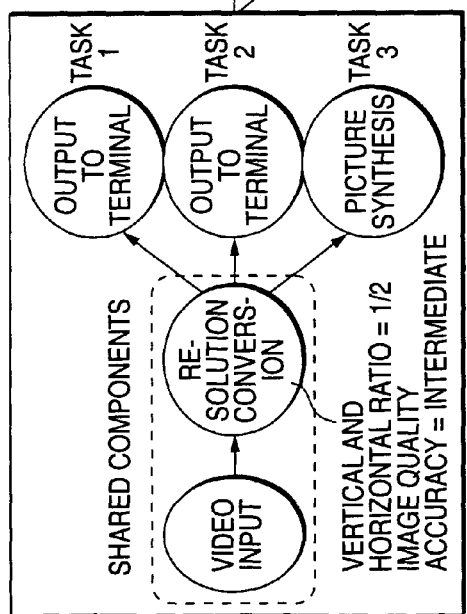
Figure 18C:
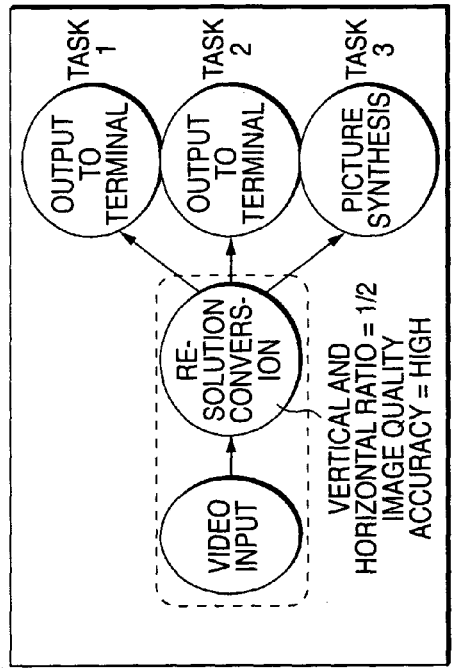

FIGS. 18A to 18C are specific diagrams showing the parameter change process. In FIG. 18A, in the tasks 1, 2 and 3 for outputting the same video signal to different terminals, the shared component is employed for video input and resolution conversion. During the resolution conversion process, the vertical and horizontal ratio parameter is set to 1/2, and the image quality accuracy parameter is set to "intermediate". In this case, the "parameter that can affect another task" is the image quality accuracy parameter, and the "inherent parameter that should be changed for each task" is the vertical and horizontal ratio parameter.

To change, to 1/4, the vertical and horizontal ratio parameter used for the resolution conversion in the task 1, as is shown in FIG. 18B, the component for performing the resolution conversion in the task 1 is newly generated, and the vertical and horizontal ratio parameter is set to 1/4, while the image quality accuracy parameter is set to intermediate. The resolution conversion for the tasks 2 and 3 is performed by using the components that are employed in common.

To improve, from intermediate to high, the image quality accuracy parameter used for the resolution conversion in the task 1, as is shown in FIG. 18C, the image quality accuracy parameter of the shared component is changed from intermediate to high. As a result, the image quality obtained by the image processes in the tasks 1, 2 and 3 is improved.

Figure 19:
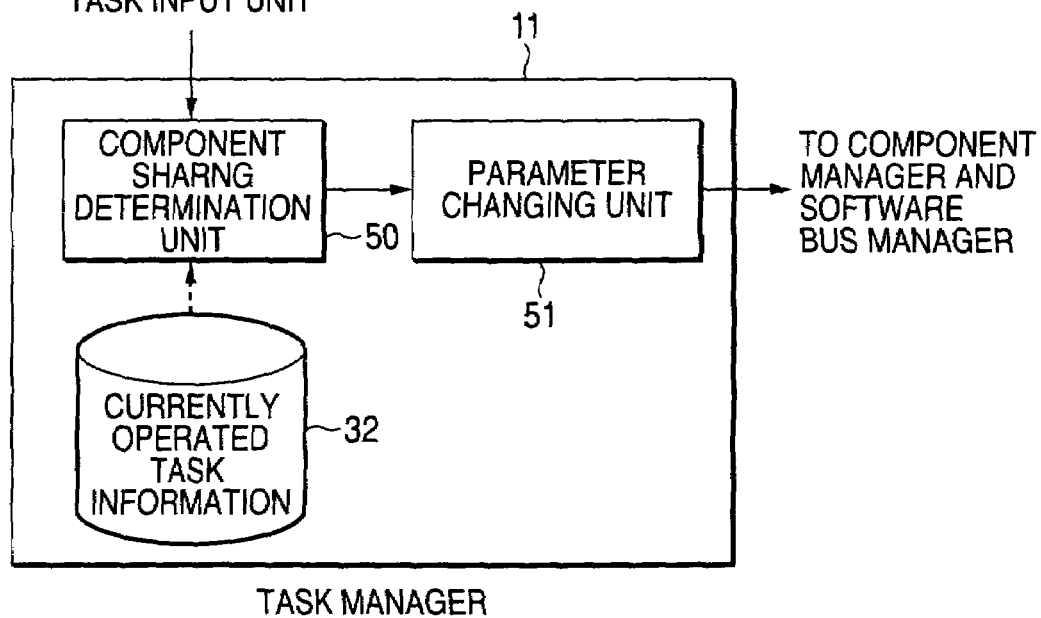
FIG. 19 is a diagram showing the arrangement of the task manager that, according to the second embodiment, performs the parameter changing process.

FIG. 19 is a diagram showing the arrangement of the task manager 11 that performs the parameter change process. The task manager 11 includes: a component sharing determination unit 50, for examining the task information 32 that is currently being processed and determining whether a component for which the parameter is to be changed is employed in common by the tasks; and a parameter change unit 51, for changing the parameter.

Upon the reception of a task number and the parameter of a component from the task input unit 18, the component sharing determination unit 50 examines the task information 32 that is currently being processed, and determines whether the component for which the parameter is to be changed is employed in common by the tasks. When the component sharing determination unit 50 determines that the component for which the parameter is to be changed is employed in common by the tasks, the parameter change unit 51 changes, in accordance with the parameter type, the parameter value of the shared component, or re-generates a task and sets a parameter value input to a new component. The parameter changed by the parameter changing unit 51 is transmitted to the component management unit 12 and the video software bus manager 13.

As is described above, while taking into account the sharing of the process between the tasks, the image processing device can perform an integration process, such as the picture synthesization or video/audio multiplexing, the isolation process for separating video images and sounds, and the component parameter change process.

Third Embodiment

For a third embodiment, an explanation will be given for the processing performed to change a replay mode in accordance with a user request and to smoothly replay video images.

Figure 20:
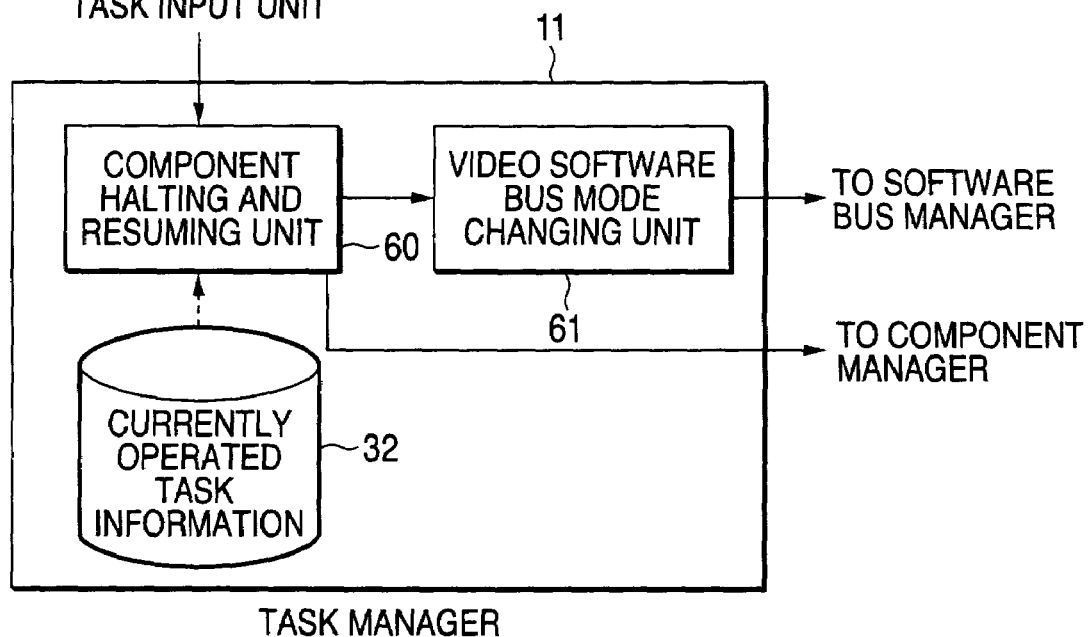
FIG. 20 is a diagram showing the arrangement of a task manager according to a third embodiment of the present invention.
Figure 23A:
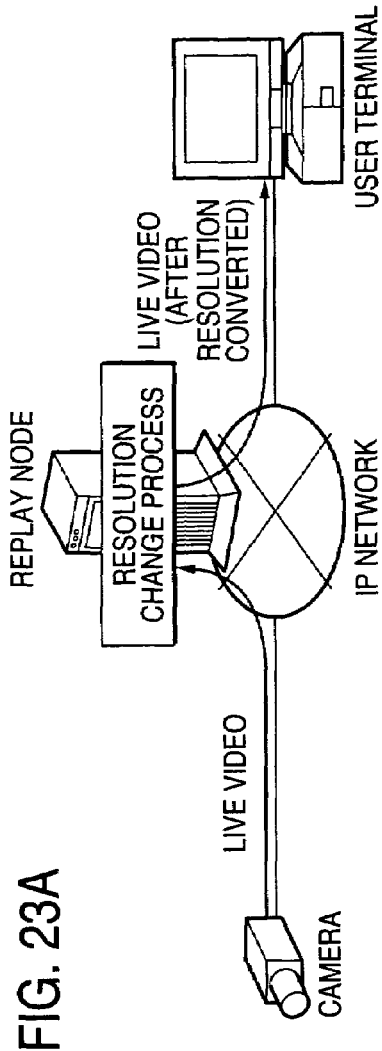
FIGS. 23A and 23B are diagrams for explaining the problem with video distribution when performed by a conventional image processing device.
Figure 23B:
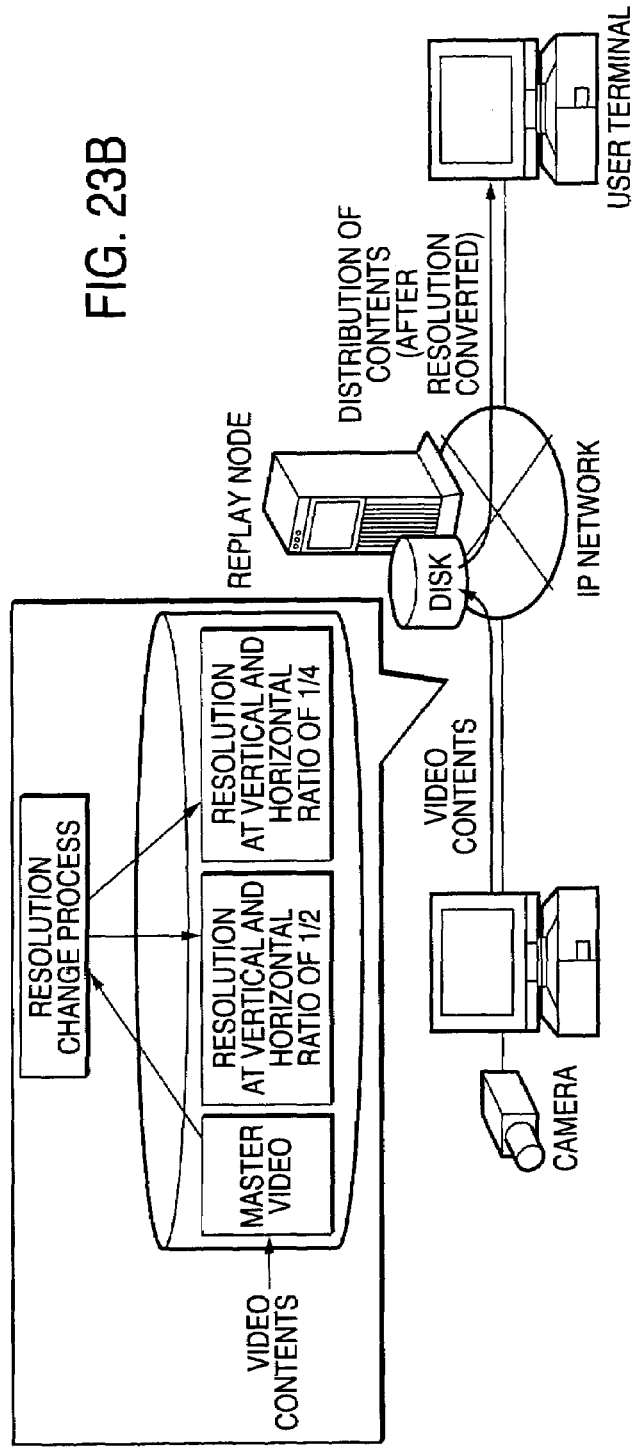
Figure 24:
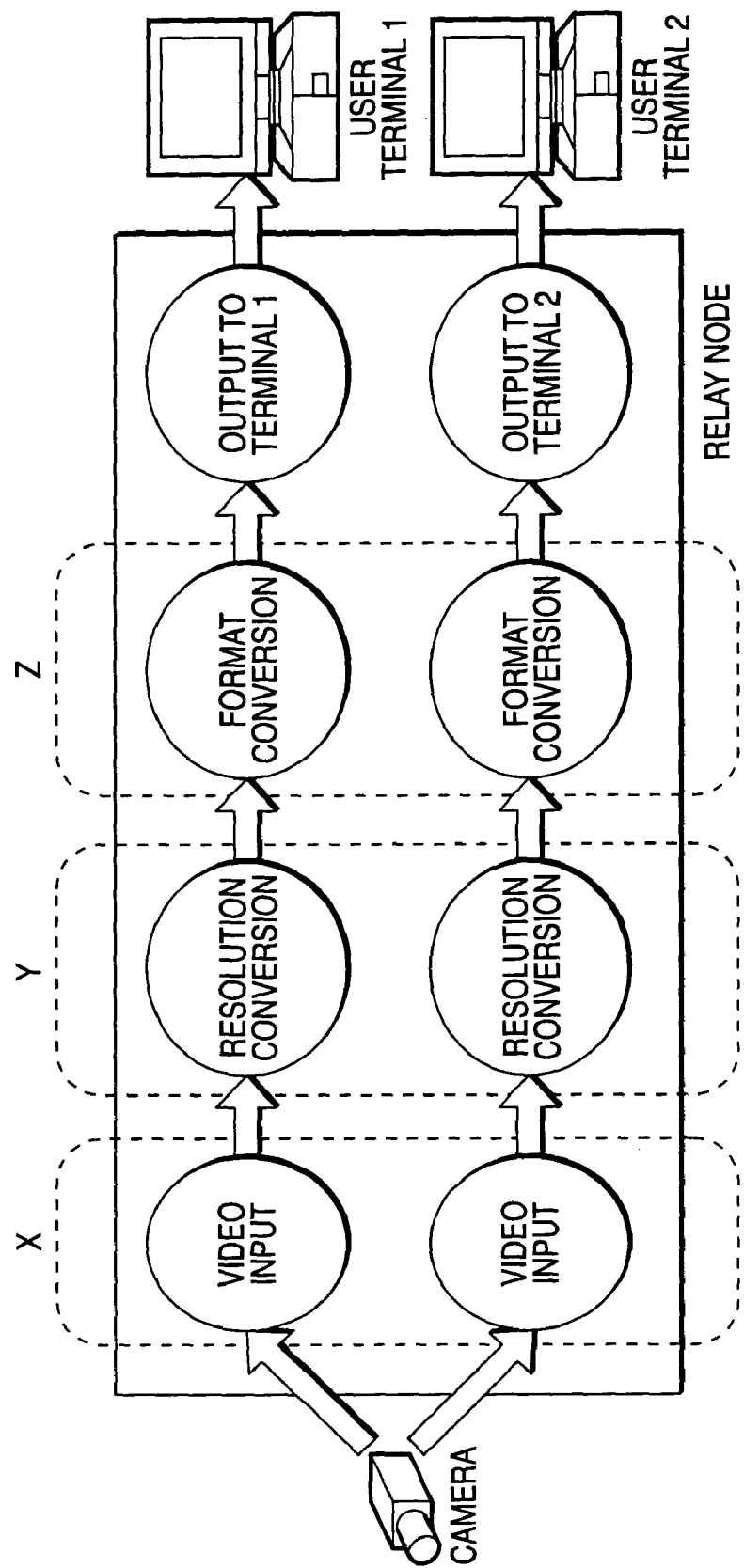
FIG. 24 is a diagram for explaining the problem with processing efficiency encountered with the conventional image processing device.

FIG. 20 is a diagram showing the arrangement of a task manager 11 that performs the video replay process. The task manager 11 includes: a component halting and resumption unit 60, for temporarily setting to the idle state all the components that constitute a task, and for resuming the operations of the components; and a video software bus mode changing unit 61, for changing the size of a buffer for the video software bus that couples the components, or for changing the data exchange method. Assume in FIG. 21 that a frame-feeding replay is in process. A component 1 processes data read from a disk and writes the resultant data to a software bus 1; a component 2 processes data read across the software bus 1 and writes the resultant data to a software bus 2; and a component 3 processes data read across the software bus 2 and outputs the resultant data to a terminal. The terminal receives a frame 5, frames 6 and 7 are written to the software bus 2, and frames 8 and 9 are written to the software bus 1.

When a user changes a replay method, a task number and bus change information indicating a change in the buffer size of the software bus and the data exchange method (change from "not thinning the frames" to "thinning the frames") are input by a task input unit 18.

The procedures performed in this case are shown in FIG. 22 The task manager 11 examines task information 32 that is currently being processed, and issues a request to a component manager 12 to halt the operations of the components used by a designated task, so that the operations of components 1, 2 and 3 are halted ((1) in FIG. 22) The video software bus mode changing unit 61 detects that the frame 6 has been written to the software bus 2 of a video software bus manager 13, and identifies the currently replayed frame as the frame 5 ((2)). Then, the video software bus mode changing unit 61 issues an instruction to the video software bus manager 13 to reset the software buses 1 and 2 ((3)).

In accordance with this bus resetting instruction, all accesses to the software buses 1 and 2 are canceled, and the method for exchanging data across the software buses 1 and 2 is changed to the method input by the task input unit 18, while the data for the software buses 1 and 2 are cleared.

Following this, the component halting and resumption unit 60 issues a request to the component manager 12 to start the operations of the components ((4)). When the operations of the components 1, 2 and 3 are begun, the video software bus mode, changing unit 61 notifies the component 1 of the currently replayed frame (frame 5) ((5)).

The component 1 begins the designated operation, beginning with the frame following the one currently being replayed (frame 5), and when the user instruction is for a switch to inverses frame feeding, as is shown in FIG. 21, the data are transmitted to the terminal in the order frame 4, frame 3, . . . . When the user instruction is for a switch to double-speed replay, the data are transmitted to, the terminal in the order frame 7, frame 9, . . . .

As is described above, according to the image processing device for this embodiment, all the video information on the video software bus is cleared in accordance with a user request for the changing of a replay mode, and the identifier of the latest frame, which is processed by a component located furthest downstream in the task, can be obtained and transmitted to the component located furthest upstream As a result, video replay as requested by a user can be implemented.

The image processing device of the invention can be employed not only for a video distribution system that distributes various video contents not only to multiple browsers, such as portable terminals and personal computers, across an IP network, such as the Internet or an intranet, but also to various other systems, such as a broadcast system and a monitoring system.

As is apparent from the explanation, the image processing device of the invention need only rewrite a task scenario that defines components constituting a task and a method for exchanging data across a software bus, so that a function consonant with the needs of a user and of an application the user is employing can be provided.

Further, simply by rewriting a task file, a function can be dynamically implemented by arbitrarily combining a video format conversion component, a resolution conversion component and an image recognition component, without re-compiling being required.

In addition, when a component, such as a resolution conversion component or a format conversion component, that requires a large number of calculations is employed by multiple functions, the components that can be shared by the functions can be automatically optimized, so that overall, the number of calculations can be reduced.

Furthermore, the integrating process, such as picture synthesization or video/audio multiplexing, the isolation process, such as inverse multiplexing, and a process for changing the parameters of components can be performed while taking into account the employment in common of the processes by functions.

Moreover, since the component manager sets the components to the idle state, and the video software bus manager changes the mode for the bus between the components, the replay modes, such as a rate replay mode and a frame-feeding replay mode, can be switched in accordance with a user request.

Also, since the component located furthest upstream is notified of the identifier of a frame that is currently being replayed, the time required to change the replay mode can be reduced, and images can be smoothly replayed.

Further, since, as on a manufacturing line, a mechanism is provided that extracts only a necessary portion and adds the results obtained upstream to the currently obtained results, functions consonant with various needs can be implemented.

What is claimed is:

1. An image processing device for executing tasks in accordance with task scenario information, said image processing device comprising:
    task storing means for storing task scenario information indicating components used for a task and coupling information of the components, component information indicating characteristics of the components, and component libraries in which the each component is stored;
    task analyzing and managing means for analyzing the task scenario information, determining components to use for the task and software buses to use for coupling the components, and managing the execution of the task;
    component managing means for generating or deleting components, as determined by the task analyzing and managing means, to control the operations performed by the components; and
    software bus managing means for generating or deleting the software buses, as determined by the task analyzing and managing means, and controlling the exchange of data across the software buses.

2. The image processing device according to claim 1, wherein the component library is capable of being dynamically linked and called, and
    wherein the component information includes information required for linking the component library.

3. The image processing device according to claim 1, wherein, when a new task is executed by the image processing device, the task analyzing and managing means determine components and software buses to be shared with the new task and a task currently running, require the component managing means to generate only components to be used for the new task and not to be shared with the task currently running, and require the software bus managing means to generate only the software buses to be used for the new task and not to be shared with the task currently running.

4. The image processing device according to claim 3, wherein the task analyzing and managing means include:
    task sharing determination means for detecting the components capable of sharing with a task and another task; and
    task component generating determination means for determining the components and software buses to be generated;
    wherein the task sharing determination means specify a currently running task handling the same contents as the new task, compare the components used for the new task and the components used for the currently running task from upstream in view of characteristics including parameters of the components, and determine the components for the new task matching exactly with the components for the currently running task and locating before a mismatching component, as components to be shared.

5. The image processing device according to claim 3, wherein a path integration task for integrating multiple paths that represent the connection of the components, said path integration task can be written into the task scenario information, and
    wherein the task analyzing and managing means analyze the task scenario information and determine components to use for the path integration task and a software bus for connecting the components.

6. The image processing device according to claim 3, wherein a path division task for dividing a path into multiple paths that represent the connection of the components, said path division task can be written into the task scenario information, and
    wherein the task analyzing and managing means analyze the task scenario information, and determines which components to use for the path division task and a software bus for connecting the components.

7. The image processing device according to claim 3, wherein the task analyzing and managing means includes component sharing determination means for determining whether the components are shared with multiple tasks, and parameter changing means for changing parameters of the shared components, and
    wherein, when an instruction is received to change the parameters of the components used by the currently running task, the parameter changing means set new parameters allocated to the components by changing the parameters of the shared components in accordance with a type of the parameter to be changed or re-generating a new task.

8. The image processing device according to claim 1, wherein the task analyzing and managing means include:
    component halting and resumption means for halting operations performed by all the components used for the currently running task, and thereafter resuming the operations performed by the components, when an instruction is received to change a buffer size for the software bus used for the currently running task or a data exchange method across the software bus; and
    video software bus mode changing means for canceling the access to the software bus and changing the buffer size for the software bus or the data exchange method across the software bus.

9. The image processing device according to claim 8, wherein, when the component halting and resumption means halt the operations of all the components, the video software bus mode changing means obtain the latest frame identifier processed by the component located furthest downstream, and thereafter clear all video information on the software bus, and
    wherein, when the component halting and resumption means resume the operation of all the components, the video software bus mode changing means notify the component located furthest upstream of the frame identifier.

10. The image processing device according to claim 1, wherein a component generated by the component managing means outputs an input data together with the results obtained by the component.

11. The image processing device according to claim 1, wherein the task storage means periodically reads the task scenario information to determine whether the connection of the components used for the task is correct.

12. A method for processing images in accordance with task scenario information, said method comprising the steps of:

task scenario reading for selecting suitable task scenario information based on task information, contents information, and information of output terminal device and for reading the selected task scenario information;

software bus generating for generating software bus based on coupling information of components included in the task scenario information;

component reading for reading components designated in the task scenario information from components stored in a component library based on the task scenario information and the component information;

component running for setting the read components to run successively in order of mention in the task scenario information; and software bus data controlling for controlling data passing within the software bus so that an output data generated by that a run component processes a content is used as an input data of a next component.

* * * * *